United States Patent
Lu et al.

(10) Patent No.: US 12,513,361 B2
(45) Date of Patent: Dec. 30, 2025

(54) DISPLAY DEVICE AND DISPLAY METHOD

(71) Applicant: HISENSE VISUAL TECHNOLOGY CO., LTD., Shandong (CN)

(72) Inventors: Pingguang Lu, Shandong (CN); Yinghao He, Shandong (CN); Yinpeng Zu, Shandong (CN); Jin Liu, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 137 days.

(21) Appl. No.: 18/588,414

(22) Filed: Feb. 27, 2024

(65) Prior Publication Data
US 2024/0205498 A1  Jun. 20, 2024

Related U.S. Application Data

(63) Continuation of application No. PCT/CN2022/109199, filed on Jul. 29, 2022.

(30) Foreign Application Priority Data

Sep. 7, 2021 (CN) .......................... 202111042636.9
May 9, 2022 (CN) .......................... 202210503314.8

(51) Int. Cl.
*H04N 21/4402* (2011.01)
*H04N 21/436* (2011.01)
*H04N 21/485* (2011.01)

(52) U.S. Cl.
CPC ............... *H04N 21/440272* (2013.01); *H04N 21/43615* (2013.01); *H04N 21/4858* (2013.01)

(58) Field of Classification Search
CPC ..... H04N 21/440272; H04N 21/43615; H04N 21/4858; G06F 9/451; G06V 10/75; G06V 40/16
See application file for complete search history.

(56) References Cited

U.S. PATENT DOCUMENTS

RE47,833 E  *  1/2020  Park ............... H04N 21/440272
11,735,095 B2 *  8/2023  Seo ....................... G09G 3/2096
                                                      345/428
(Continued)

FOREIGN PATENT DOCUMENTS

CN          101944349 A       1/2011
CN          102740154 A       10/2012
(Continued)

OTHER PUBLICATIONS

International Search Report, mailed Oct. 28, 2022, from PCT/CN2022/109199, 6 pages.
(Continued)

*Primary Examiner* — John R Schnurr
(74) *Attorney, Agent, or Firm* — Workman Nydegger

(57) ABSTRACT

A display apparatus and a display method are disclosed. The display apparatus includes: a display, configured to display an image and/or a user interface; an external device interface, configured to connect an external device; at least one processor, configured to execute instructions to cause the display apparatus to: obtain a first command input from a user for switching a viewing angle ratio; obtain audio and video meta information of the external device, and parse a flag field in the audio and video meta information; send declaration information to the external device according to the first command in response to the flag field being identical to a determination field; receive video data returned from the external device for the declaration information, where an image ratio of the video data is equivalent with the switched viewing angle ratio; and control the display to display the video data.

20 Claims, 20 Drawing Sheets

(56) References Cited

U.S. PATENT DOCUMENTS

| | | | | |
|---|---|---|---|---|
| 11,825,157 | B2* | 11/2023 | Ko | H04N 21/4621 |
| 11,882,331 | B2* | 1/2024 | Choi | H04N 21/4363 |
| 2006/0017751 | A1* | 1/2006 | Shintani | G09G 5/003 |
| | | | | 345/698 |
| 2012/0075526 | A1* | 3/2012 | DeHaan | H04N 21/431 |
| | | | | 348/E7.003 |
| 2015/0371364 | A1 | 12/2015 | Park | |
| 2016/0112667 | A1* | 4/2016 | Park | G06F 3/0346 |
| | | | | 348/739 |
| 2017/0013231 | A1* | 1/2017 | Kwon | H04N 21/4363 |
| 2019/0230412 | A1* | 7/2019 | Sun | H04N 21/485 |
| 2022/0246076 | A1* | 8/2022 | Jang | H04N 21/485 |
| 2022/0345773 | A1* | 10/2022 | Choi | H04N 21/84 |
| 2022/0394317 | A1* | 12/2022 | Jang | G09G 5/006 |
| 2023/0100652 | A1* | 3/2023 | Jang | A63F 13/5378 |
| | | | | 463/31 |
| 2023/0205408 | A1* | 6/2023 | Kim | H04N 21/4316 |
| | | | | 345/660 |

FOREIGN PATENT DOCUMENTS

| | | | | |
|---|---|---|---|---|
| CN | 102917232 | A | | 2/2013 |
| CN | 105578105 | A | | 5/2016 |
| CN | 105892963 | A | | 8/2016 |
| CN | 106155606 | A | | 11/2016 |
| CN | 106464968 | A * | 2/2017 | G09G 5/006 |
| CN | 106529449 | A | | 3/2017 |
| CN | 106572389 | A | | 4/2017 |
| CN | 106686332 | A * | 5/2017 | H04N 5/765 |
| CN | 108055584 | A | | 5/2018 |
| CN | 108388849 | A | | 8/2018 |
| CN | 108762707 | A | | 11/2018 |
| CN | 110462581 | A | | 11/2019 |
| CN | 111064972 | A | | 4/2020 |
| CN | 111526415 | A | | 8/2020 |
| CN | 111885418 | A | | 11/2020 |
| CN | 112533021 | A | | 3/2021 |
| CN | 113840757 | A | | 12/2021 |
| CN | 114286138 | A | | 4/2022 |
| JP | 2013246761 | A | | 12/2013 |
| JP | 2017134657 | A | | 8/2017 |
| JP | 2019113647 | A | | 7/2019 |
| WO | 2019009922 | A1 | | 1/2019 |

OTHER PUBLICATIONS

Chinese First Office Action, mailed Feb. 11, 2023, from China Patent App. No. 202111042636.9, 18 pages.

Chinese First Office Action, mailed Feb. 11, 2023, from China Patent App. No. 202210503314.8, 15 pages.

Yun-Fu Liu et al., "Panoramic Face Recognition", IEEE Transactions on Circuits and Systems for Video Technology, Apr. 12, 2017, pp. 1864-1874.

Vk, Greeshma et al., "Framework for Simulating and Testing Different Display Topologies", 2018 International Conference on Advances in Computing, Communications and Informatics (ICACCI), Bangalore, India, Sep. 19, 2018, pp. 1854-1858.

* cited by examiner

| Packet Byte (Packet Byte) | CEA-861-D Byte (Byte) | 7 | 6 | 5 | 4 | 3 | 2 | 1 | 0 |
|---|---|---|---|---|---|---|---|---|---|
| PB0 | n.a. | Checksum (Checksum) | | | | | | | |
| PB1 | Data Byte 1 (Data Byte 1) | Rsvd (0) | Y1 | Y0 | A0 | B1 | B0 | S1 | S0 |
| PB2 | Data Byte 2 (Data Byte 2) | C1 | C0 | M1 | M0 | R3 | R2 | R1 | R0 |
| PB3 | Data Byte 3 (Data Byte 3) | TTC | EC2 | EC1 | EC0 | Q1 | Q0 | SC1 | SC0 |
| PB4 | Data Byte 4 (Data Byte 4) | Rsvd (0) | VIC6 | VIC5 | VIC4 | VIC3 | VIC2 | VIC1 | VIC0 |
| PB5 | Data Byte 5 (Data Byte 5) | YQ1 | YQ0 | CN1 | CN0 | PR3 | PR2 | PR1 | PR0 |

Fig. 10

DISPLAY DEVICE AND DISPLAY METHOD

CROSS REFERENCE TO RELATED APPLICATION

This application is a continuation application of International Application No. PCT/CN2022/109199, filed on Jul. 29, 2022, which claims priorities to Chinese patent application No. 202111042636.9, filed on Sep. 7, 2021, and Chinese patent application No. 202210503314.8, filed on May 9, 2022, all of which are hereby incorporated by reference in their entireties.

TECHNICAL FIELD

The present disclosure relates to the field of intelligent display apparatus, and in particular to a display apparatus and a display method.

BACKGROUND

With the development and advancement of science and technology, functions of display apparatuses have become more and more diversified, bringing great convenience to people's work and life. The display apparatus refers to a terminal device that can output a specific display image, which can be a smart TV, a mobile terminal, a smart advertising screen, a projector and other terminal devices. Taking the smart TV as an example, the smart TV is a television product, which is based on Internet application technology, can include an open operating system and chip, can include an open application platform, can realize mutual human-computer interaction functions, and integrates multiple functions such as audio and video, entertainment, and data, and is used to meet diverse and personalized requirements of users.

However, when a current display apparatus can display a multimedia content, the display apparatus can generally only display the multimedia content at a fixed image display ratio, etc., affecting the user's viewing effect.

SUMMARY

Some embodiments of the present disclosure provide a display apparatus, including: a display, configured to display an image and/or a user interface; an external device interface, configured to connect an external device; at least one processor, configured to execute instructions to cause the display apparatus to: obtain a first command input from a user for switching a viewing angle ratio; obtain audio and video meta information of the external device, and parse a flag field in the audio and video meta information; send declaration information to the external device according to the first command in response to the flag field being identical to a determination field, where the determination field is an identification value set by a graphic processor of the external device at a fixed position in a frame of the audio and video meta information, the declaration information includes identification data that conforms to a protocol version of the external device interface and a switched viewing angle ratio; receive video data returned from the external device for the declaration information, where an image ratio of the video data is equivalent with the switched viewing angle ratio; and control the display to display the video data.

Some embodiments of the present disclosure provide a display method for a display apparatus, including: obtaining a first command input from a user for switching a viewing angle ratio; obtaining audio and video meta information of an external device, and parsing a flag field in the audio and video meta information; sending declaration information to the external device according to the first command in response to the flag field being identical to a determination field, where the determination field is an identification value set by a graphic processor of the external device at a fixed position in a frame of the audio and video meta information, the declaration information includes identification data that conforms to a protocol version of an external device interface of the display apparatus and a switched viewing angle ratio; receiving video data returned from the external device for the declaration information, where an image ratio of the video data is equivalent with the switched viewing angle ratio; and controlling a display of the display apparatus to display the video data.

BRIEF DESCRIPTION OF FIGURES

FIG. 10 is a schematic diagram of audio and video meta information according to some embodiments;

DETAILED DESCRIPTION

Embodiments will be described in detail below, examples of which are illustrated in the accompanying drawings. When the following description refers to the drawings, the same numbers in different drawings refer to the same or similar elements unless otherwise indicated. It should be noted that the brief description of terms in this application is only to facilitate understanding of embodiments described below, and is not intended to limit embodiments of the present application. Unless otherwise stated, these terms should be understood according to their ordinary and usual meaning.

Figure 1A:
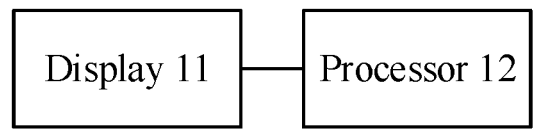
FIG. 1A is a schematic structural diagram of a display apparatus according to some embodiments.

FIG. 1A is a schematic structural diagram of a display apparatus according to some embodiments. As shown in FIG. 1A, the display apparatus may include a display 11 and a processor 12. The processor 12 may determine a target display mode for a multimedia content to be displayed based on a command from a user. The target display mode may be used for describing a target image display ratio of the multimedia content to be displayed and/or a target image display position of the multimedia content, that is, the target display mode may only describe the target image display ratio of the multimedia content, or the target display mode may only describe the target image display position of the multimedia content, or the target display mode may describe the target image display ratio of the multimedia content and the target image display position of the multimedia content. In addition, the processor 12 may control the display 11 to display the multimedia content based on the target display mode.

The display apparatus of the present disclosure will be discussed in detail through specific embodiments below.

In some embodiments, the display apparatus is also provided with an external device interface. The display apparatus may be connected with an external device through the external device interface to receive audio and video data (i.e. the multimedia content) sent from the external device, and play the multimedia content. For example, a typical smart TV is provided with a High Definition Multimedia Interface (HDMI) port. An external device such as a console may be connected with the smart TV through the HDMI port and outputs a game image to the smart TV to take advantage of a large screen of the smart TV to display the game image for a better gaming experience. However, since the video data sent from the external device to the display apparatus has a specific viewing angle ratio, and the display apparatus has a specific image display ratio and other display modes due to the screen of the display apparatus having a specific physical size ratio, when the viewing angle ratio of the multimedia content does not match the physical size ratio of the screen (image display ratio), it may cause the display apparatus to be unable to receive appropriate video signals in some viewing angle ratio modes, causing the display apparatus to be unable to display the multimedia content sent from the external device, reducing the user experience.

Figure 1B:
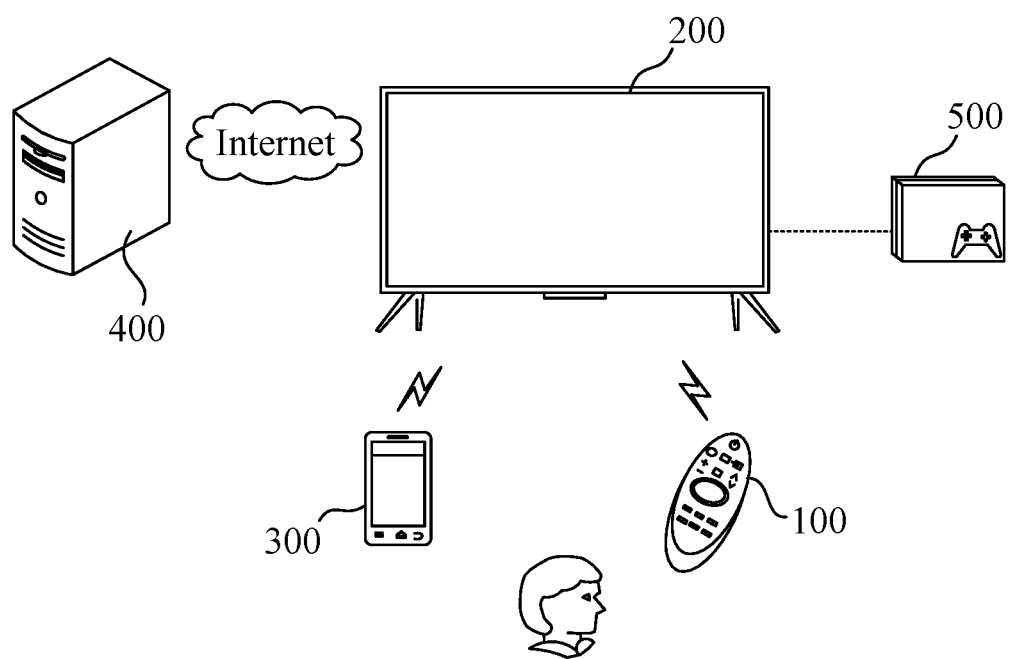
FIG. 1B is a schematic diagram of a use scenario of a display apparatus according to some embodiments.

FIG. 1B is a schematic diagram of a use scenario of a display apparatus according to some embodiments. As shown in FIG. 1B, the display apparatus 200 further performs data communication with the server 400, and the user may operate the display apparatus 200 through a smart device 300 or a control device 100.

In some embodiments, the control device 100 may be a remote controller, and the communication between the remote controller and the display apparatus can include at least one of an infrared protocol communication or a Bluetooth protocol communication, and other short-distance communication methods, and the display apparatus 200 is controlled through wireless or wired methods.

In some embodiments, the smart device 300 may include any one of a mobile terminal, a tablet computer, a computer, a laptop, an Augmented Reality (AR)/Virtual Reality (VR) device and etc.

In some embodiments, the smart device 300 may be further used to control the display apparatus 200. For example, the display apparatus 200 is controlled using an application running on the smart device.

In some embodiments, the smart device 300 and the display apparatus may be further used to communicate data.

In some embodiments, the display apparatus 200 may be further controlled in a manner other than the control device 100 and the smart device 300. For example, the display apparatus 200 may directly receive a voice command control from the user through a module for obtaining a voice command configured inside the display apparatus 200 to. The voice command control from the user may be further received through a voice control device provided outside the display apparatus 200.

In some embodiments, display apparatus 200 may further perform data communication with the server 400. The display apparatus 200 may be allowed to communicate via a local region network (LAN), a wireless local region network (WLAN), and other networks. The server 400 may provide various contents and interactions to the display apparatus 200.

Figure 2:
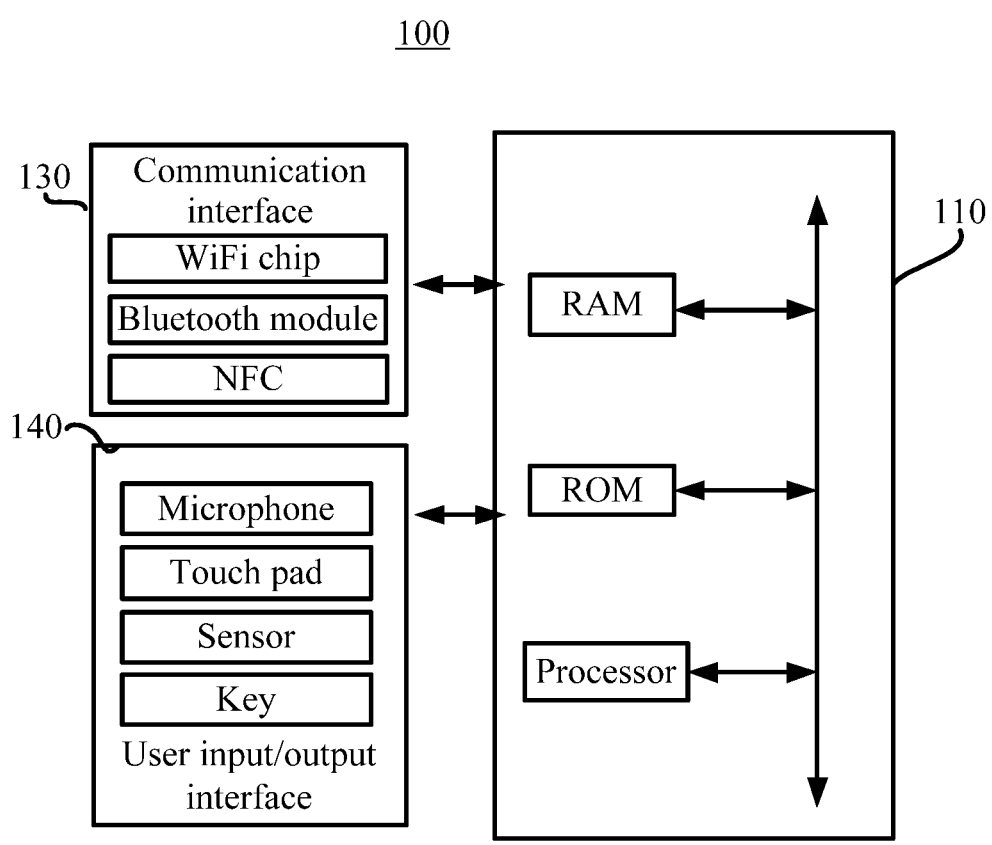
FIG. 2 is a hardware configuration block diagram of a control device according to some embodiments.

FIG. 2 is a hardware configuration block diagram of a control device 100 according to some embodiments. As shown in FIG. 2, the control device 100 can include a processor 110, a communication interface 130, a user input/output interface 140, a memory, and a power supply. The control device 100 may receive an input operation command from a user, and convert the operation command into an instruction that can be recognized and responded by the display apparatus 200, playing an intermediary role between the user and the display apparatus 200.

In some embodiments, the communication interface 130 is configured to execute instructions to cause the display apparatus to be in communication with outside. The communication interface 130 can include at least one of a WIFI chip, a Bluetooth module, a Near Field Communication (NFC) module or an alternative module.

In some embodiments, the user input/output interface 140 can include at least one of a microphone, a touch pad, a sensor, a key or an alternative module.

Figure 3:
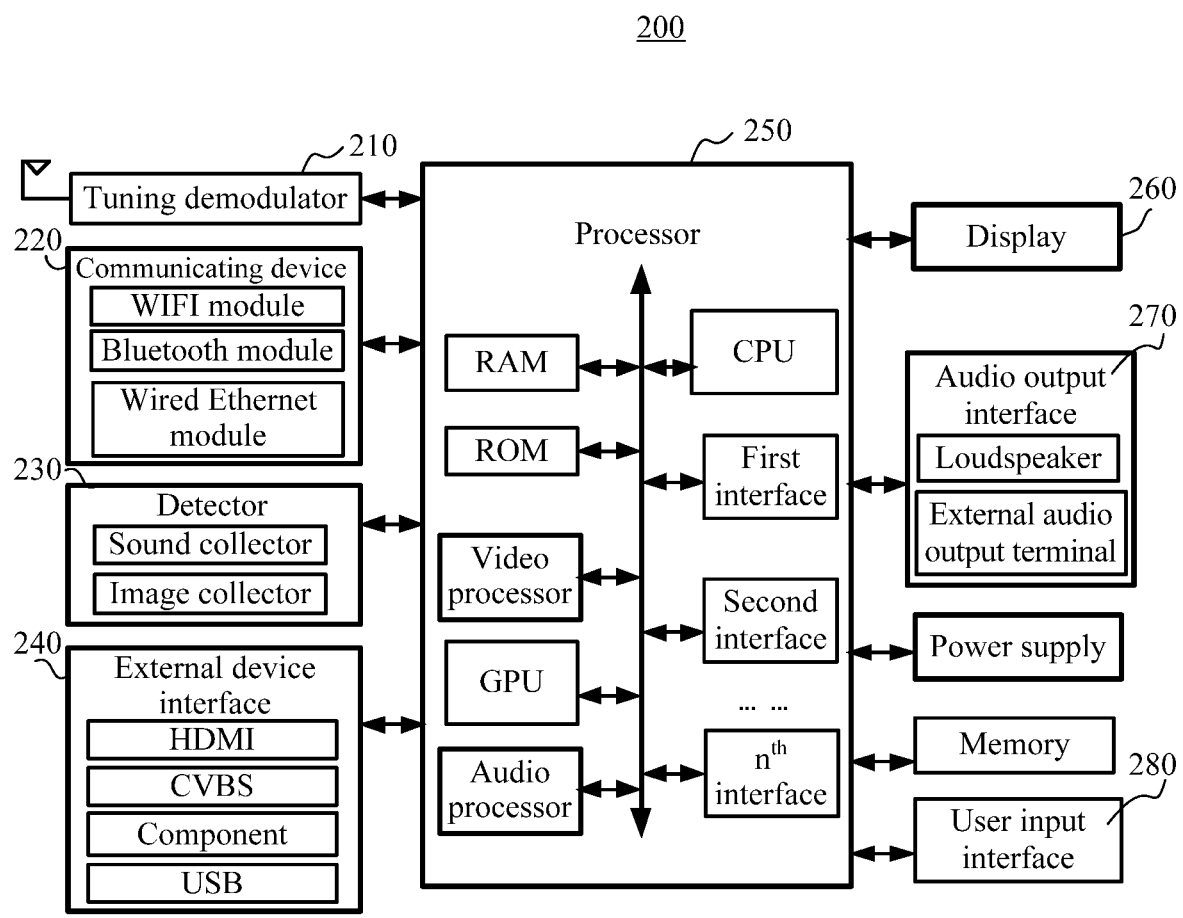
FIG. 3 is a hardware configuration diagram of a display apparatus according to some embodiments.

FIG. 3 is a hardware configuration block diagram of a display apparatus 200 according to some embodiments.

In some embodiments, the display apparatus 200 can include at least one of a tuning demodulator 210, a communicating device 220, a detector 230, an external device interface 240, a processor 250, a display 260, an audio output interface 270, a memory, a power supply, or a user input interface.

In some embodiments, the processor can include a Central Processing Unit (CPU), a video processor, an audio processor, a Graphics Processing Unit (GPU), a Random Access Memory (RAM), a Read Only Memory (ROM), and first to $n^{th}$ interfaces for input/output.

In some embodiments, the display 260 can include a panel component for presenting an image, a driving component for driving image display, a component for receiving an image signal output from the processor, and for presenting video content, image content, a menu operation interface, and a UI for user operation.

In some embodiments, the display 260 may be at least one of a liquid crystal display (LCD), an Organic Light Emitting Diode (OLED) display, or a projection display. The display 260 can be also a projection device and a projection screen.

In some embodiments, the tuning demodulator 210 receives broadcasting television signals through a wired or wireless reception, and demodulates audio-video signals from multiple wireless/wired broadcasting television signals, such as Electronic Program Guide (EPG) data signals.

In some embodiments, communicating device 220 is a component configured to execute instructions to cause the display apparatus to communicate with an external device or a server through various communication protocol types. For an example, the communicating device 220 can include at least one of a Wifi module, a Bluetooth module, a wired Ethernet module, other communication protocol chips or a NFC chip, or an infrared receiver. The display apparatus 200 can send and receive control signals and data signals with the control device 100 or the server 400 through the communicating device 220.

In some embodiments, the detector 230 is configured to execute instructions to cause the display apparatus to collect external environment signals or signals interacting with the external environment. For example, the detector 230 can include an optical receiver, a sensor configured to execute instructions to cause the display apparatus to collect an intensity of ambience light. Alternatively, the detector 230 can include an image collector, such as a camera, configured to execute instructions to cause the display apparatus to collect an external environment scenario, user attributes or user interaction gestures. Further alternatively, the detector 230 can include a sound collector, such as a microphone and etc., configured to execute instructions to cause the display apparatus to receive external sound.

In some embodiments, the external device interface 240 may include but not be limited to: a High-Definition Multimedia Interface (HDMI), an analog/data high-definition component input interface (Component), a Composite Video Broadcast Signal (CVBS) interface, a Universal Serial Bus (USB) interface, or an RGB interface. Further, the external device interface 240 can be a composite input/output interface formed by multiple aforementioned interfaces.

In some embodiments, the processor 250 and the tuning demodulator 210 may be in different independent devices, that is, the tuning demodulator 210 can be in an external device of a primary device in which the control device 250 is located, such as an external set-top box and etc.

In some embodiments, the processor 250 is configured to execute instructions to cause the display apparatus to control the operation of the display apparatus and respond to the user operation through various software control programs stored in the memory. The processor 250 is configured to execute instructions to cause the display apparatus to control the overall operation of the display apparatus 200. For example, the processor 250 can perform operations corresponding to a selected object in response to a user command for selecting an object presented on the display.

In some embodiments, the processor can include at least one of a Central Processing Unit (CPU), a video processor, an audio processor, a Graphics Processing Unit (GPU), a Random Access Memory (RAM), a Read Only Memory (ROM), first to $n^{th}$ interfaces for input/output, or a communication bus (Bus), etc.

The CPU is configured to execute instructions to cause the display apparatus to run an operating system and application instructions stored in the memory, and implement various applications, data and contents according to various interaction instructions from external input, so as to finally display and play various audio, video contents. The CPU can include multiple processors, for an example, a main processor and one or more sub-processor.

In some embodiments, the user can input user commands through the GUI displayed on the display. Then, the user input interface receives the user commands through the GUI. Alternatively, the user can input user commands through inputting specified voice or gestures. Then, the user input interface receives the user commands through a sensor recognizing the voice or gestures.

In some embodiments, the user input interface 280 may be an interface for receiving input, such as physical buttons on the display apparatus and etc.

Figure 4:
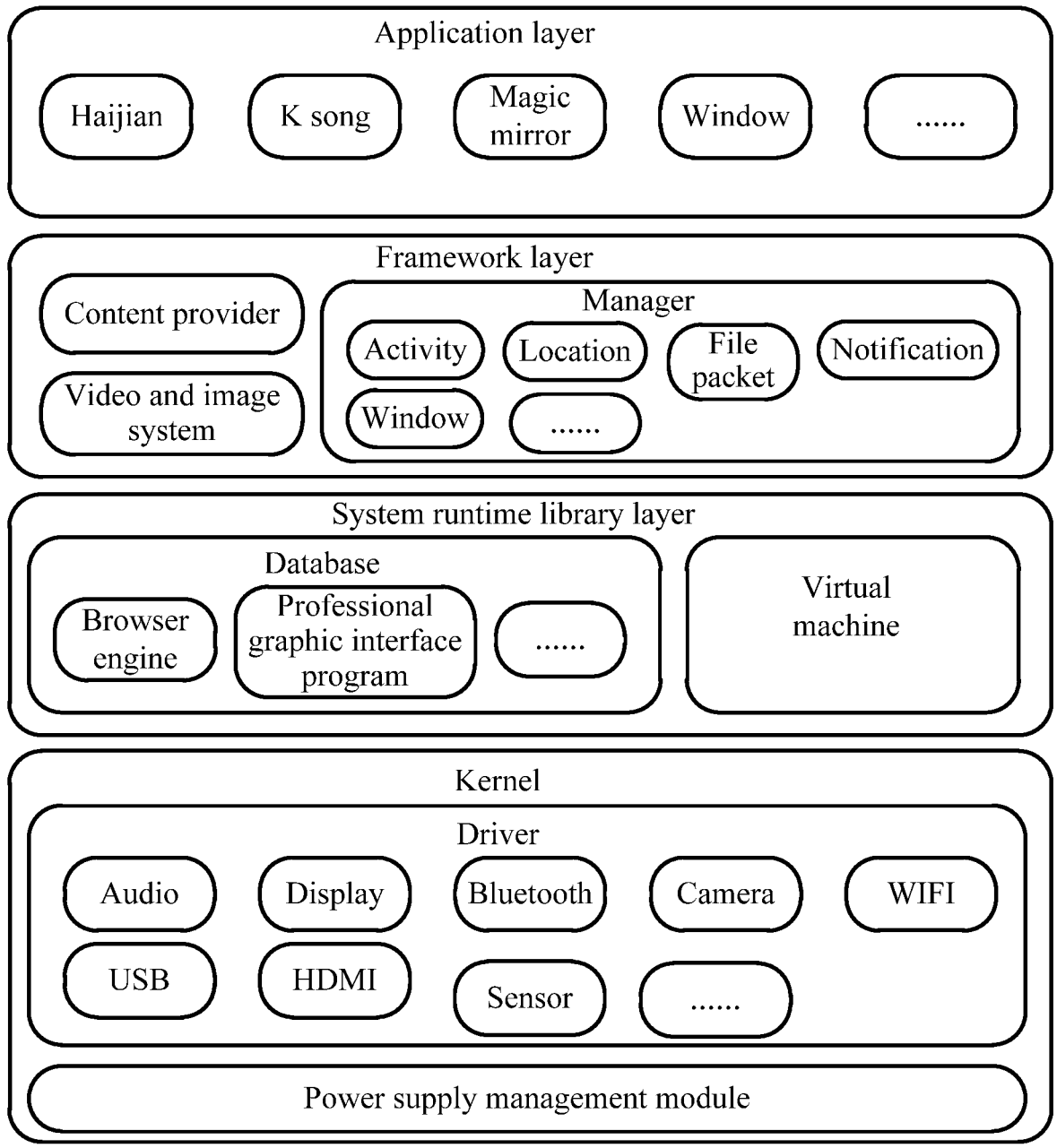
FIG. 4 is a software configuration diagram of a display apparatus according to some embodiments.

Referring to FIG. 4, in some embodiments, the system can be divided into four layers, which are applications layer (application layer for short), application framework layer (framework layer for short), android runtime and system library layer (system runtime library layer for short) and Kernel layer.

Figure 5:
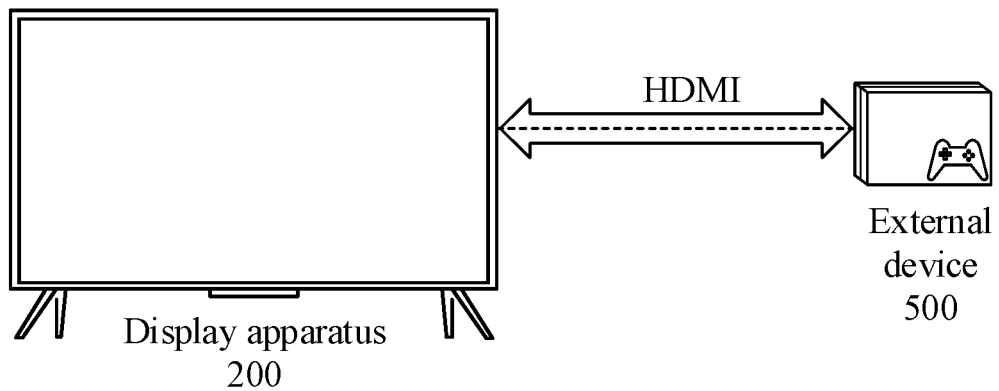
FIG. 5 is a schematic diagram of a connection relationship between a display apparatus and an external device according to some embodiments.

In some embodiments of the present disclosure, connecting the display apparatus 200 with the external device 500 refers to establishing a communication connection, and the display apparatus 200 and the external device 500 that establish the communication connection serve as a receiving end (Sink end) and a sending end (source end) respectively. For example, as shown in FIG. 5, the external device 500 can be a game device. When the user uses the game device, the game device can output a multimedia content such as video data and audio data in real time for the game process, and send the multimedia content such as the video data and audio data to the display apparatus 200, so as to output the multimedia content such as the video data and audio data as video images and sounds through the display apparatus 200. In this case, the game device serves as the sending end, and the display apparatus 200 serves as the receiving end.

The communication connection between the sending end and the receiving end can be realized through a specific interface to transfer data. To this end, both the sending end and the receiving end should be equipped with data interfaces with the same interface specification and function. For example, as shown in FIG. 5, both the display apparatus 200 and the external device 500 are provided with a High Definition Multimedia Interface (HDMI) port or interface. During utilization, the user can plug both ends of the HDMI port data cable into the display apparatus 200 and the external device 500 respectively, and after turning on the external device 500 and the display apparatus 200, set the signal source of the display apparatus 200 to be the HDMI port, thereby realizing data transmission between the display apparatus 200 and the external device 500.

It should be noted that, in order to realize the communication connection between the display apparatus 200 and the external device 500, other connection methods may also be used between the display apparatus 200 and the external device 500. The specific connection method can be a wired connection method, such as DVI (Digital Visual Interface), VGA (Video Graphics Array), USB (Universal Serial Bus), etc.; the connection method can also be a wireless connection method, such as wireless LAN, Bluetooth connection, infrared connection etc. Different communication connection methods can use different information transfer protocols. For example, when using an HDMI port to realize the connection, data communication is performed according to HDMI protocol.

Figure 6:
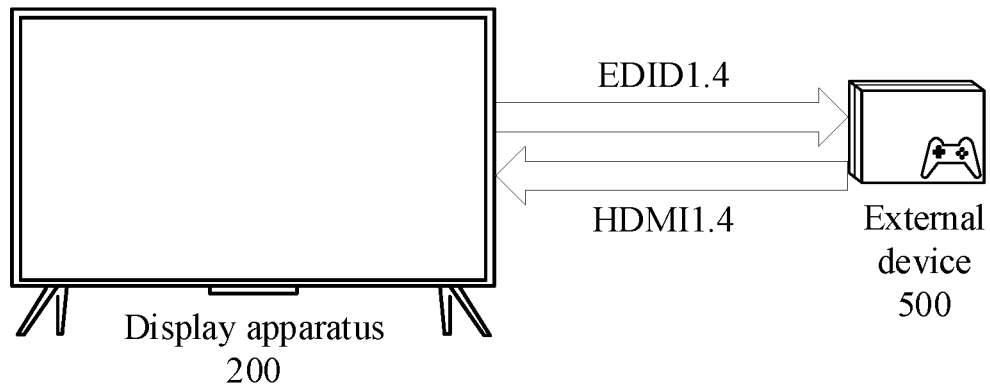
FIG. 6 is a schematic diagram of a data transmission relationship between a display apparatus and an external device according to some embodiments.

For example, the display apparatus 200 may be connected with a game device through an HDMI port. When the user uses the game device, the game device can output a multimedia content such as video data and audio data by running game-related programs. the multimedia content such as video data and audio data can be transmitted to the smart TV according to a HDMI protocol and output through the screen and speaker of the smart TV to play the video and audio from the game device. After being connected with the display apparatus 200, the external device 500 can transmit data according to a specific standard, so that the display apparatus and the external device can establish mutual recognition and establish a data transmission channel. For example, as shown in FIG. 6, the display apparatus 200 can establish a connection with the external device 500 based on Extended Display Identification Data (EDID), and realize mutual recognition and control.

Since the display apparatus 200 and the external device 500 are two independent functional units, after the external device 500 establishes a connection with the display apparatus 200, the display apparatus 200 can display the image content according to the display ratio corresponding to the screen resolution. In order to obtain a better display effect, the external device 500 needs to send the multimedia content to the display apparatus 200 in accordance with a viewing angle ratio that matches the display apparatus 200. For example, the screen resolution of the display apparatus 200 is 3840×2160, which is suitable for the viewing angle ratio of 16:9. When the display apparatus 200 is connected with the external device 500 to display the image output from the external device 500, the external device 500 also needs to send a video image with a viewing angle ratio of 16:9 to the display apparatus 200.

It should be noted that, depending on different uses of the display apparatus 200, the screen resolution of the display apparatus 200 can also be expressed in other forms. For example, in order to adapt to a wide-screen game image, the screen resolution of a professional e-sports display can reach 21:9 or 32:9. Obviously, since the screen resolution of the display apparatus 200 is determined by hardware characteristics, the optimal viewing angle ratio that the display apparatus 200 can support during the display process is fixed. For convenience of description, the viewing angle ratio determined by the screen resolution of the display apparatus 200 is called physical ratio.

In some embodiments, when displaying the video image sent from the external device 500, the display apparatus 200 can also scale and/or stretch the image to adapt to the wide-screen viewing angle ratio. For example, when the screen resolution of the display apparatus 200 is 3840×2160 and the corresponding physical ratio is 16:9, but the to-be-displayed game image resolution is 3840×1080 and the corresponding viewing angle ratio is 32:9, the display apparatus 200 can still display the game image. During the display process, the display apparatus 200 can stretch the game image along the image height direction based on the game image height of 1080 pixels, so that the game image fills the entire display apparatus 200 in the height direction.

However, this display method of stretching to fill the entire screen may change the original proportion of the image, causing problems such as deformation and abnormal proportion of the presented image content. Therefore, in order to maintain the original proportion of the image, in some embodiments, the display apparatus 200 can also use partial display based on the game image height of 1080 pixels, so that the game image is presented in the middle of the screen of the display apparatus 200, and upper and lower parts of the game image are displayed by filling a solid color background.

For the display apparatus 200 that can support wide-screen display, after being connected with the external device 500, the display apparatus 200 needs to declare a support status of the wide-screen viewing angle. After receiving declaration information, the external device 500 develops relevant functions for the user so that the user can choose to switch. For example, the current host graphics card can support HDMI wide viewing angle image output. After the EDID of the display apparatus declares that the wide viewing angle is supported, the host can obtain this information and develop relevant functions for the user to choose to switch. However, since resolutions such as 21:9 or 32:9 are not clearly specified in the HDMI protocol, the display apparatus 200 needs to generate corresponding EDID content based on its own device characteristics.

However, currently only the display apparatus 200 with a physical size of 21:9 or 32:9 may make such a statement, and generally a display apparatus 200 of 16:9 must still fix the optimal resolution to 16:9 in order to be compatible with other input signal sources. Therefore, during the image display process, the professional e-sports display has better compatibility with wide viewing angle signals, but poor compatibility with ordinary 16:9 signals, and there may be no signal. Likewise, the general display apparatus 200 cannot enable wide viewing angle signals to be normally input, resulting in poor user experience.

Furthermore, since the wide-screen viewing angle is used for display, the corresponding image form of the multimedia content sent from the external device 500 to the display apparatus 200 may change. Therefore, during wide-screen display, the amount of data sent from the external device 500 to the display apparatus 200 may also change. There are differences in the data transmission rates supported by different connection methods and communication protocols. As a result, some multimedia content with the wide-screen viewing angle cannot be sent through the current version of the transmission protocol due to the incompatibility between the transmission protocol version and the data form, resulting in a problem of no signal. For example, when the display apparatus 200 can support three versions of HDMI protocol standards: HDMI1.4, HDMI2.0 and HDMI2.1, limited by the maximum transmission rates of different HDMI versions, standard timing data for declaring the wide viewing angle ratio under each HDMI version may be affected by the bandwidth, causing the wide viewing angle data to be unable to be transmitted to the display apparatus 200, causing problems such as no signal.

In view of the no-signal issue in the above situation, in some embodiments of the present disclosure, a display method is provided. The method can be applied to the display apparatus. The display apparatus can determine a target display mode of a multimedia content to be displayed based on a command from a user. The target display mode is used for describing a target image display ratio of the multimedia content and/or a target image display position of the multimedia content, and the multimedia content can be displayed based on the target display mode. The display apparatus 200 can obtain a first command input from the user for switching a viewing angle ratio; in response to the first command, send declaration information to the external device, the declaration information including identification data that conforms to a protocol version of the external device interface and a switched viewing angle ratio; the display apparatus 200 can receive the multimedia content returned from the external device in response to the declaration information. The target image display ratio of the multimedia content can be equivalent with the switched viewing angle ratio. That is to say, the display apparatus 200 can declare to the external device 500 its supported viewing angle ratio so as to enable the external device 500 to send the multimedia content that matches the viewing angle ratio to the display apparatus 200 according to the declaration of the display apparatus 200.

Obviously, in order to be able to implement the multi-viewing ratio display method, the display apparatus 200 should at least include: a display, an external device interface and a processor 250. The display can be configured to execute instructions to cause the display apparatus to display a user interface, and the user can control the display mode and specific display content of the display apparatus 200 through the user interface displayed by the display. For example, the user interface may be provided with an option for switching a display ratio, and the user can use this option to change the display to display in a ratio of 16:9, 21:9, 32:9, etc. The user interface may also be provided with a signal source option, through which the user can set an input signal source of the display apparatus 200 to be the network, a set-top box, or an external device 500 to display the multimedia content sent from different signal sources.

The external device interface 240 is configured to execute instructions to cause the display apparatus to connect the external device 500 to achieve a communication connection relationship with the external device 500. The display apparatus 200 may include a plurality of external device interfaces 240, and the plurality of external device interfaces 240 may be based on different connection ways. Different external device interfaces 240 can transmit data through different interface protocols, and the same interface protocol can also include different protocol versions. For example, the external device interface 240 can be an HDMI port on the display apparatus 200, and the external device 500 can be connected with the HDMI port through an HDMI data cable to realize the connection with the display apparatus 200, thereby receiving the multimedia content such as audio data and video data sent from the external device 500 through the HDMI protocol of version like HDMI1.4, HDMI2.0, HDMI2.1, and etc.

Figure 7:
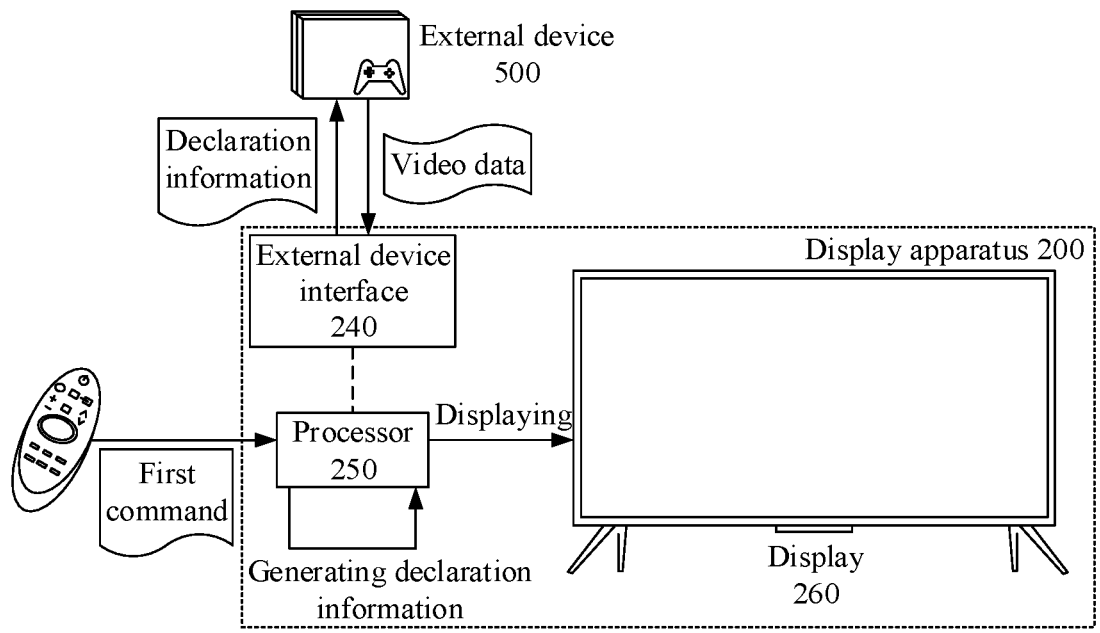
FIG. 7 is a schematic flowchart of a multi-view ratio display process according to some embodiments.

The processor 250 is configured to execute instructions to cause the display apparatus to execute the application corresponding to the display method, so as to control the display process of the display apparatus 200 through the method. The application corresponding to the display method can be directly configured in the processor 250, or can be stored in a built-in memory of the display apparatus 200, so that the processor 250 can invoke and run the application. As shown in FIG. 7, the display method can include following contents.

A first command input from a user for switching a viewing angle ratio is obtained. After the display apparatus 200 establishes a connection relationship with the external device 500, the display apparatus 200 can detect commands input from the user in real time. Some of the commands can be used to switch the viewing angle ratio so that the display apparatus 200 can display the image according to the new viewing angle ratio. For convenience of description, in some embodiments of the present disclosure, the command for switching the viewing angle ratio is called the first command.

The first command can be input through different interactive actions according to the interaction mode supported by the display apparatus 200 and the specific type of the display apparatus 200. That is, in some embodiments, the first command can be input based on a specific user interface. For example, the display apparatus 200 may be provided with function buttons, and the display apparatus 200 can display a setting interface, for example, by pressing a "menu" function button. The setting interface may include multiple viewing angle ratio options, and the user then uses direction keys to control a focus cursor to select any viewing angle ratio option in the setting interface to select the setting function corresponding to the viewing angle ratio option. That is, the user can control the movement of the focus cursor, select the 21:9 option among the 16:9 option, the 21:9 option and the 32:9 option in a viewing angle ratio column in the setting interface, and control the display apparatus 200 to display the image content according to the ratio of 21:9.

Figure 8:
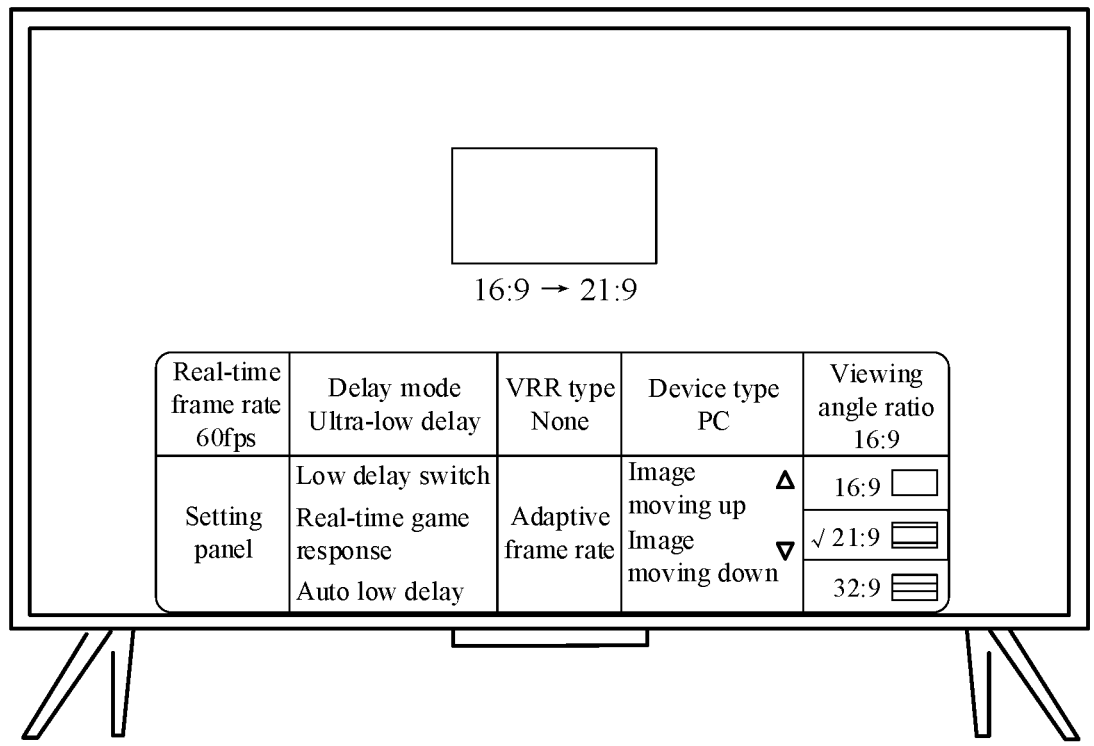
FIG. 8 is a schematic diagram of a setting interface according to some embodiments.

It should be noted that the viewing angle ratio options provided in the setting interface can be presented as different viewing angle ratio content according to the specific form of the display apparatus 200. For example, as shown in FIG. 8, for a horizontal screen display apparatus 200, that is, a display apparatus 200 with a screen width greater than a screen height, the viewing angle ratios provided in the setting interface can also be in the horizontal screen form, that is, the 16:9 option, 21:9 option and 32:9 option, etc.; for the vertical screen display apparatus 200, that is, the display apparatus 200 with a screen width smaller than a screen height, the viewing angle ratios provided in the setting interface are also in the vertical screen form, that is, the 9:16 option, 10:16 option and 3:5 option, etc.

The setting interface may also provide other setting items for the display apparatus 200. For example, the setting interface may also include: a "Real-time frame rate" option, used to display the current image refresh rate in real time; a "Delay mode" option, used to turn on or turn off the delay mode of the display apparatus, including low latency mode, real-time game response mode and automatic low latency mode; a "VRR type" option, used to turn on or turn off the adaptive frame rate mode; a "Device type" option, used to display the device type of the current external device; an "Image move" option, used to adjust the display position of the image.

It can be seen that in some embodiments, the display apparatus 200 can control the display to display a setting interface in response to the user's interaction, and the setting interface can include multiple image movement options and multiple viewing angle ratio switching options. After the setting interface is displayed, the display apparatus 200 can monitor a selection action from the user based on the setting interface, and when the user performs a selection action on an image movement option, adjust a display position of the multimedia content on the display according to the image movement option; when the user performs the selection action on a viewing angle ratio switching option, generate a command for switching the viewing angle ratio according to the viewing angle ratio switching option selected by the selection action.

The user can input the first command through a fixed button provided on the display apparatus 200, or through a control device 100 matching the display apparatus 200. For example, the control device 100 may be provided with a button for switching the viewing angle ratio. When the user clicks the button, the display apparatus 200 may be caused to switch the viewing angle ratio, thereby inputting the first command. Obviously, for some control device 100 with a simplified design, there is generally no individual button for switching the viewing angle ratio, and the focus cursor is controlled to move and select the option for switching the viewing angle ratio in the setting interface through menu buttons, direction buttons and other buttons in conjunction with the setting interface displayed on the display apparatus 200, thereby inputting the first command.

For some display apparatus 200 that can support other interaction methods, the user can also input the first command through the corresponding interaction method. For example, when the display apparatus 200 can support touch interaction, the user can select an option for switching the viewing angle ratio through a touch operation to trigger the display apparatus 200 to switch the viewing angle ratio, that is, to input the first command. For the display apparatus 200 that can support touch interaction, the user can also trigger the display apparatus 200 to switch the viewing angle ratio through specific gesture actions, such as sliding down from the top of the screen with two fingers and sliding up from the bottom of the screen with two fingers to control the display apparatus 200 to display according to the wide screen ratio, thereby inputting the first command.

For another example, for the display apparatus 200 with a built-in intelligent voice interaction system, the user can control the display apparatus 200 to switch the viewing angle ratio by inputting voice contents such as "switch viewing angle ratio", "display in 32:9 ratio", and the like, thereby inputting the first command.

After the user inputs the first command through any of the above methods, the display apparatus 200 may respond to the first command and send declaration information to the external device 500 to inform the external device 500 of the viewing angle ratio format currently supported by the display apparatus 200. Here, the declaration information can include identification data that conforms to the corresponding interface protocol version of the external device interface 240 and the switched viewing angle ratio.

For example, the declaration information can include extended display identification data (EDID) information; the identification data can include standard timing data in the EDID information, that is, standard timing data in the EDID declaration. When the display apparatus 200 is connected with the external device 500 through the HDMI port and performs data interaction with the external device 500 through the HDMI1.4 protocol, the display apparatus 200 can parse from the first command that the switched viewing angle ratio is 21:9 after receiving the first command input from the user, and then determine the multimedia content form that meets two conditions that the current protocol version is HDMI1.4 and the switched viewing angle ratio is 21:9, that is, the multimedia content with the resolution of 3840×1600 and the frame rate of 30. Then standard timing data can be generated according to the multimedia content form, and EDID information including the standard timing data can be sent to the external device 500.

It should be noted that for different display apparatuses 200, as well as different interface methods and transmission protocol versions, the display apparatus 200 can declare the viewing angle ratio format it can support to the external device 500 through declaration information including different identification data, so that the corresponding multimedia content can be returned to the display apparatus 200 from the external device 500 according to the declared viewing angle ratio. Obviously, since different interface protocol versions support different transmission methods, for the same viewing angle ratio, video formats corresponding to different interface protocol versions are also different. For example, based on the limitation of the maximum transmission rate described in HDMI 1.4 version, the highest image quality of the multimedia content transmitted according to HDMI 1.4 version is 4K, 30 Hz (that is, 3840×2160, 30 Hz). Therefore, the wide-angle video quality of the HDMI1.4 version should not be higher than the above extreme value. Therefore, when the switched viewing angle ratio is 21:9, the current HDMI1.4 version can support up to 3840×1600, 30 Hz multimedia content transmission; and when the switched viewing angle ratio is 32:9, the current HDMI1.4 version can support up to 3840×1080, 60 Hz multimedia content transmission.

After the display apparatus 200 sends the declaration information to the external device 500, the external device 500 can send multimedia content to the display apparatus 200 according to identification data in the declaration information. Obviously, the target image display ratio of multimedia content can be equal to the switched viewing angle ratio. For example, when the EDID information sent from the display apparatus 200 to the external device 500 includes standard timing data with a resolution of 3840×1600 and a frame rate of 30 Hz, the external device 500 can return the multimedia content with a resolution of 3840×1600 and a frame rate of 30 Hz to the display apparatus 200 based on the identification data.

The multimedia content sent from the external device 500 to the display apparatus 200 may be presented in different forms according to the type of the external device 500. For example, when the external device 500 is a personal computer (PC), a game console, or other device that can generate a video image in real time, the external device 500 can render the video image of a corresponding specification in real time according to the video image specification recorded in the identification data. When the external device 500 is a device such as a media resource database, the external device 500 can match media resource data of the video image specification in the media resource database according to the video image specification recorded in the identification data, and return it to the display apparatus 200.

Corresponding to the multimedia content returned from the external device 500, the display apparatus 200 can receive the multimedia content returned from the external device 500 in response to the declaration information after sending the declaration information to the external device 500, and play the multimedia content received, that is, control the display to display the multimedia content.

It can be seen that, in the above embodiments, after the user inputs a first command for switching the viewing angle ratio, the display apparatus 200 can send declare information to the external device 500 according to the switched viewing angle ratio and the current interface protocol version included in the first command, so that the external device 500 can return multimedia content that conforms to the current interface protocol version and the switched viewing angle ratio to the display apparatus 200, and the external device 500 can correctly return the multimedia content to the display apparatus 200 and alleviate the problem of no signal for some viewing angle ratios.

Since most non-PC, game console and other devices with graphics processing units do not support multi-view signal output, when the display apparatus 200 sets the standard timing data of the EDID information to be wide-screen view related timing, the external device 500 may be unable to parse the EDID information, and the signal output is disabled. In this case, the display apparatus 200 also has a problem of no signal.

Figure 9:
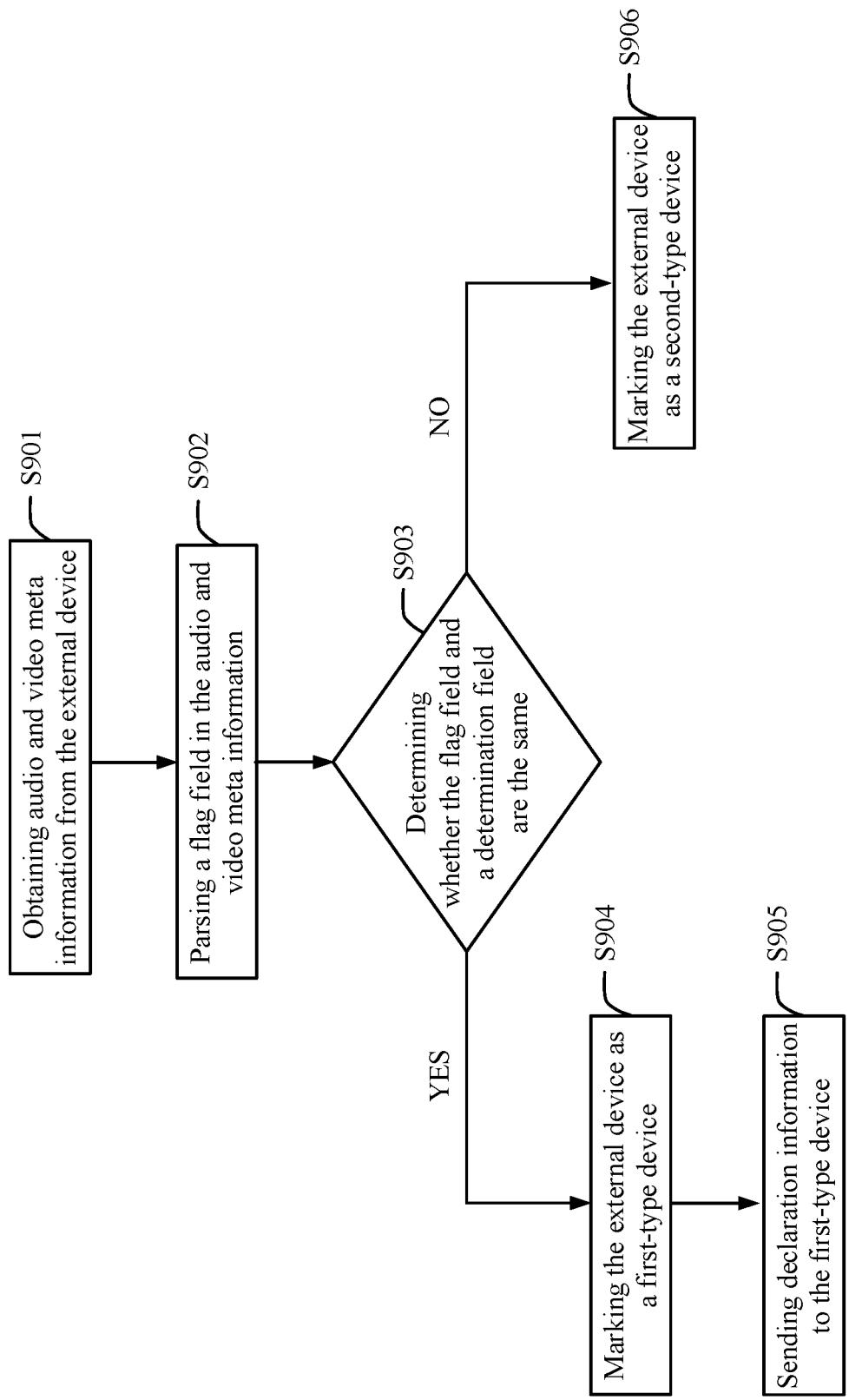
FIG. 9 is a schematic flowchart of detecting a type of an external device according to some embodiments.

In view of the above issue, as shown in FIG. 9, FIG. 9 is a schematic flowchart of detecting a type of an external device according to some embodiments. The process can include following steps.

S901: Obtaining audio and video meta information from the external device.

In some embodiments, in order to enable the external device 500 to cooperate with the display apparatus 200 to send appropriate multimedia content, after the external device 500 is connected with the external device interface 240 of the display apparatus 200, the display apparatus 200 can detect the device type of the external device 500, that is, the display apparatus 200 can obtain the audio and video meta information from the external device 500 when the external device 500 is connected with the external device interface 240.

S902: Parsing a flag field in the audio and video meta information.

In some embodiments, a field value of a corresponding flag can be determined by parsing the flag field in the audio and video meta information.

S903: Determining whether the flag field and a determination field are the same; if the flag field and the determination field are the same, the flow goes to S904; if the flag field and the determination field are not the same, the flow goes to S906.

S904: Marking the external device as a first-type device.

S905: Sending declaration information to the first-type device.

S906: Marking the external device as a second-type device.

For example, as shown in FIG. 10, the display apparatus 200 can obtain the audio and video meta information (AV info) from the external device 500 when detecting that a signal is input via HDMI port. Since the audio and video meta information is generally transmitted over an independent frame of data, so the audio and video meta information obtained by the display apparatus 200 is also called AV info frame information. The AV info frame information may include multiple fields, each field is located at a different position and is used to characterize an audio and video characteristic of the external device 500. That is, in the AV info information fragment shown in FIG. 10, columns 0-7 and rows PB0-PB5 can constitute a data table. According to the uncompressed digital video standard formulated by the Consumer Electronics Association (CEA), each cell position in the table can be defined as a specific numerical value. Here, the external device 500 can define field values in multiple positions according to the information content sent to the display apparatus 200. That is, when the external device 500 is a host device, the ITC field located in row PB3 and column 7 is set to 1, the CN1 field located in row PB5 and column 5 is set to 0, and the CN0 located in row PB5 and column 4 is set to a field value of 0.

Hosts with mainstream graphics card types may forcibly set ITC=1 and CN1=CN0=0. Moreover, the setting information may be sent to the display apparatus 200 regardless of whether the external device 500 declares support for parsing in the EDID. Therefore, the display apparatus 200 can determine the type of the external device 500 by detecting the field values in the AV info frame information, that is, by detecting the field values at the ITC, CN1, and CN0 positions in the AV info frame information to determine whether the fields at the corresponding flags in the AV info frame information conform to the above values, and determine whether the external device 500 is a PC device.

If the flag field is identical to the determination field, the external device 500 is marked as a first-type device. The first-type device can refer to a device that can return to the display apparatus 200 the multimedia content that conforms to the corresponding viewing angle ratio, for example, a PC device that can return a video image with a viewing angle ratio of 21:9 to the display apparatus 200. The determination field is an identification value set by a graphics processor of the external device 500 at a fixed position in a frame of the audio and video meta information. For example, when it is detected that ITC=1 and CN1=CN0-0 in the AV info frame information, it can be determined that the current external device 500 is a first-type device. After determining that the current external device 500 is the first-type device, the display apparatus 200 may send declaration information to the external device 500 in the method according to the above embodiments to cause the external device 500 to return the multimedia content with the switched viewing angle ratio.

If the flag field is different from the determination field, the external device 500 is marked as a second-type device. Here, the second-type device can refer to a device that cannot return the multimedia content that conforms to the corresponding viewing angle ratio to the display apparatus 200. For example, the external device 500 is a terminal device that can only provide the display apparatus 200 with a viewing angle ratio of 16:9. When the external device 500 is determined to be the second-type device, since the external device 500 does not support the switched viewing angle ratio, the display apparatus 200 needs to update the EDID information according to the original viewing angle ratio, so that the display apparatus 200 can maintain the image display ratio of 16:9.

Figure 11:
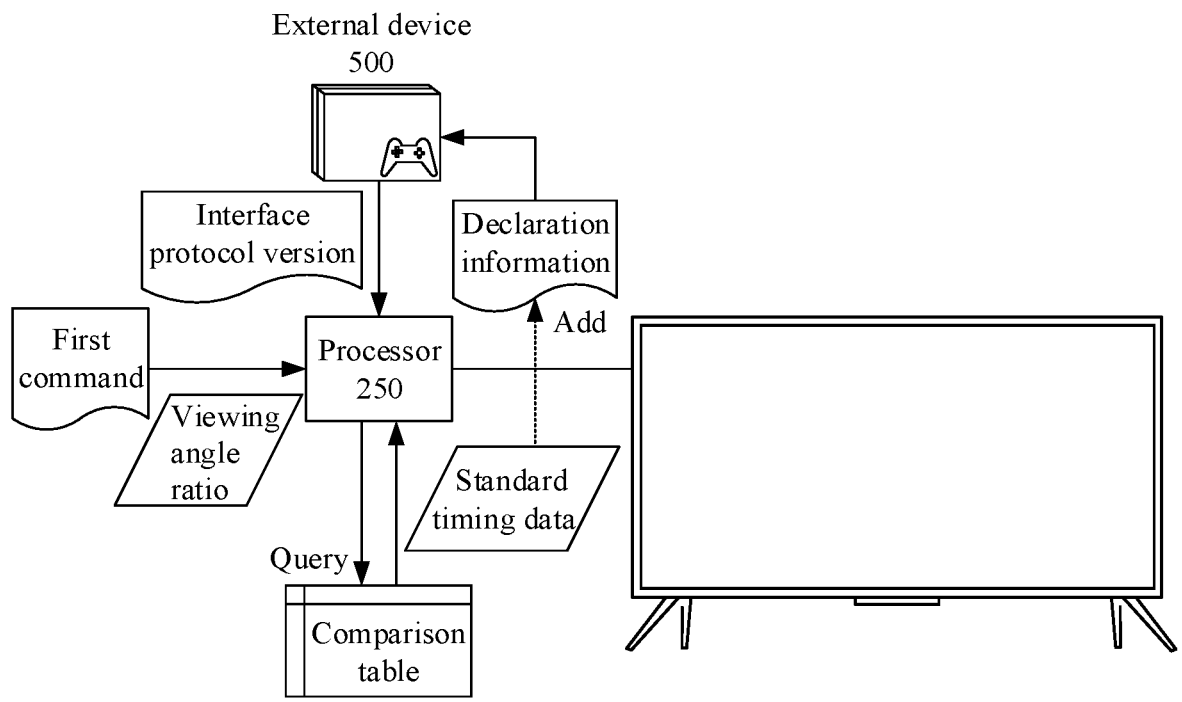
FIG. 11 is a schematic flowchart of generating declaration information according to some embodiments.

In order to make the declaration information sent from the display apparatus 200 to the external device 500 include identification data that conforms to a current interface protocol version, in some embodiments, after receiving the first command, the display apparatus 200 may query the specific content of the identification data according to the first command and the current Interface protocol, that is, as shown in FIG. 11, when sending the declaration information to the external device 500, the display apparatus 200 can extract the switched viewing angle ratio in the first command, and detect the interface protocol version currently used by the external device interface 240. Then using the switched viewing angle ratio and protocol version to query the standard timing data in a preset comparison table, thereby adding the standard timing data to the EDID information to generate declaration information.

The preset comparison table can include multiple protocol versions and standard timing data determined according to the maximum transmission rate supported by each protocol version. For example, after the display apparatus 200 and the external device 500 are connected through an HDMI port, the corresponding HDMI protocol that can be adopted may include three versions: 1.4, 2.0, and 2.1. Meanwhile, the display viewing angle ratios currently supported by the display apparatus can include three ratio specifications of 16:9, 21:9 and 32:9, the display apparatus can include the following comparison table:

| Timing comparison table | viewing angle ratio of 16:9 | viewing angle ratio of 21:9 | viewing angle ratio of 32:9 |
| --- | --- | --- | --- |
| HDMI1.4 | 3840 × 2160, 30 Hz | 3840 × 1600, 30 Hz | 3840 × 1080, 60 Hz |
| HDMI2.0 | 3840 × 2160, 60 Hz | 3840 × 1600, 60 Hz | 3840 × 1080, 60 Hz |
| HDMI2.1 | 3840 × 2160, 120 Hz | 3840 × 1600, 120 Hz | 3840 × 1080, 120 Hz |

When the user inputs the first command, the viewing angle ratio of 32:9 is selected in the setting interface, and the display apparatus 200 and the external device 500 are connected according to the HDMI 1.4 protocol, the display apparatus 200 can find corresponding timing data in the above comparison table according to the switched viewing angle ratio of 32:9 and the current interface protocol version HDMI 1.4, that is, the current display apparatus 200 can support the maximum resolution of 3840×1080 and the maximum refresh rate of 60 Hz corresponding to the viewing angle ratio of 32:9. Thus, EDID information is generated according to the corresponding timing data and sent to the external device 500, so that the external device 500 can return the multimedia content with a resolution not higher than 3840×1080 and a frame rate not higher than 60 Hz.

The above comparison table can be uniformly configured by the operating service provider of the display apparatus 200, that is, the operating service provider can generate an appropriate comparison table according to the interface protocol version supported by each display apparatus 200, and save the comparison table in the display apparatus 200 when leaving factory or after online activation. When the display apparatus 200 needs to generate declaration information, the comparison table can be called from the memory or downloaded from the server of the operating service provider.

In some embodiments, the comparison table can also be generated by the display apparatus 200 through executing a detection program. That is, after the external device 500 is connected with the display apparatus 200, the display apparatus 200 can traverse the currently supported external device interface protocol versions, and obtain the maximum transmission rate of each version of the external device interface protocol, so as to calculate the maximum resolution and the maximum frame rate transmitted by the external device interface protocol based on the maximum transmission rate. Finally, the standard timing data is generated based on the maximum resolution and the maximum frame rate, and the standard timing data is stored to generate a comparison table.

For example, when the HDMI versions supported by the display apparatus 200 include HDMI 1.4, HDMI 2.0 and HDMI 2.1, it is determined that there are three types of EDID information sent by the display apparatus 200. Due to the maximum transmission rate limit under each HDMI version, the maximum resolution of version 1.4 is 4K and the maximum frame rate of version 1.4 is 30 Hz. The maximum resolution of version 2.0 is 4K and the maximum frame rate of version 2.0 is 60 Hz. The maximum resolution of version 2.1 is 4K and the maximum frame rate of version 2.1 is 120 Hz. Therefore, it is necessary to ensure that each wide viewing angle resolution under the HDMI versions must not be greater than the above maximum values. The content of standard timing data for each highest image quality can be automatically determined in combination with the screen characteristics (including screen resolution, screen refresh rate, etc.) of the display apparatus 200.

Since different interface protocol versions may affect the corresponding identification data in the declaration information, and for the display apparatus 200 or external device 500 that can support multiple versions of the interface protocol, the user can switch the interface protocol version during use. Therefore, when the interface protocol version used by the display apparatus 200 and the device 500 changes, the corresponding identification data may also change.

Figure 12:
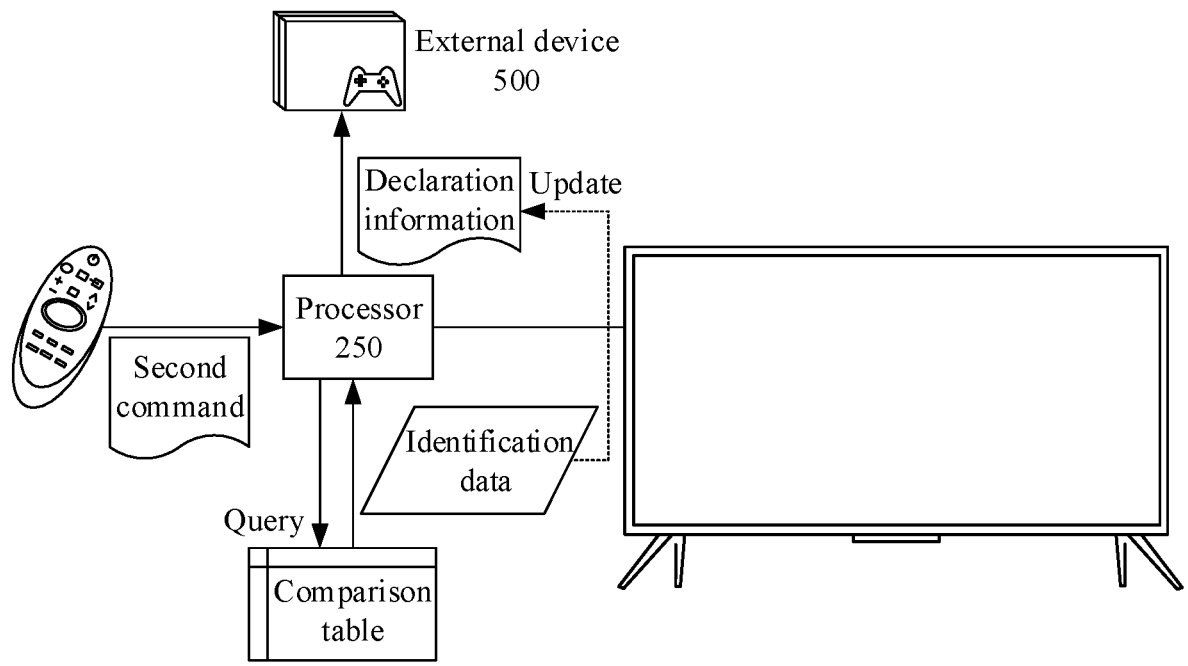
FIG. 12 is a schematic flowchart of switching a protocol version according to some embodiments.

In view of the above, as shown in FIG. 12, in some embodiments, the display apparatus 200 can also update the declaration information when the user switches the interface protocol version, so that the external device 500 can return the multimedia content that conforms to the current interface protocol version and viewing angle ratio to the display apparatus 200 according to the updated declaration information. That is, the display apparatus 200 can obtain a second command input from the user for switching the protocol version of the external device interface, and query identification data according to a switched protocol version of the external device interface in response to the second command. Then the declaration information is updated according to queried identification data so as to send the updated declaration information to the external device 500.

For example, when the display apparatus 200 can display a video image with a viewing angle ratio of 21:9, if the user replaces the HDMI cable or changes the HDMI protocol version from HDMI 1.4 to HDMI 2.0, then the display apparatus 200 can query the comparison table according to the switched interface protocol version 2.0 to obtain the timing data content with a viewing angle ratio of 21:9 specified the HDMI 2.0 version, that is, the maximum display resolution is 3840×1600, and the maximum frame rate is 60 Hz. Based on this, the display apparatus 200 can use the timing data to update the EDID information, and send the EDID information to the external device 500.

After receiving the updated declaration information, the external device 500 can send the multimedia content to the display apparatus 200 according to the new timing data. For example, when the timing data included in the received EDID information is that the maximum display resolution supported by the current display apparatus 200 is 3840× 1600 and the maximum frame rate is 60 Hz, the multimedia content with a resolution of 3840×1600 and a frame rate of 60 Hz can be sent to the display apparatus.

Obviously, since the data transmission capability corresponding to a new version of the interface protocol is higher than the data transmission capability corresponding to an old version of the interface protocol, when the user switches the interface protocol version from an old version to a new version, the external device 500 can keep the multimedia content form before updating to return the multimedia content, and can also use the updated multimedia content form to return the multimedia content. When the user switches the interface protocol version from the new version to the old version, the external device 500 must return the multimedia content in accordance with the updated multimedia content form.

For example, when the user can control to switch the HDMI protocol version from HDMI 1.4 to HDMI 2.0, for the multimedia content with a viewing angle ratio of 21:9, the external device 500 can still return the multimedia content with a frame rate of 30 Hz, or can return the multimedia content with a frame rate of 60 Hz. When the user can control to switch the HDMI protocol version from HDMI 2.0 to HDMI 1.4, for the multimedia content with a viewing angle ratio of 21:9, the external device 500 must change the multimedia content with a frame rate of 60 Hz to the multimedia content with a frame rate of 30 Hz in order to use transmission capability of the lower version protocol.

In order to cause the external device 500 to return the multimedia content, in some embodiments, the display apparatus 200 can cause the external device 500 to perform a corresponding return action by changing a hotplug voltage. That is, in the step of receiving the multimedia content returned from the external device 500 for the declaration information, the display apparatus 200 can control to lower the hotplug voltage according to the declaration information to notify the external device 500 to read the declaration information, and after a preset delay time, control to lower the hotplug voltage again to notify the external device 500 to switch the viewing angle ratio and return the multimedia content according to the switched viewing angle ratio.

Figure 13:
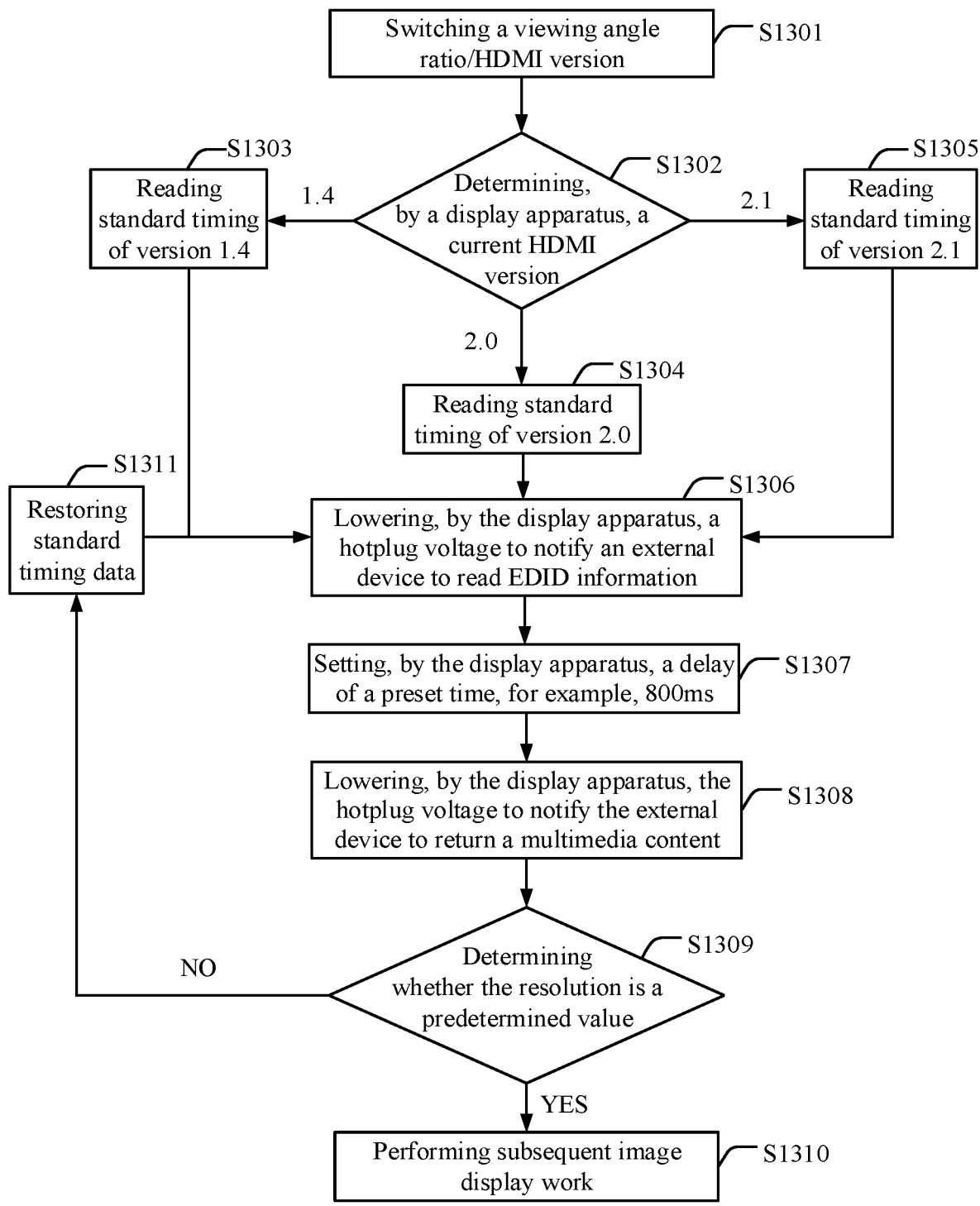
FIG. 13 is a schematic diagram of a display flow according to some embodiments.

For example, as shown in FIG. 13, FIG. 13 is a schematic diagram of a display process according to some embodiments. The process can include following steps.

S1301: Switching a viewing angle ratio/HDMI version.

S1302: Determining, by a display apparatus, a current HDMI version. If the current HDMI version is version 1.4, the flow goes to S1303; if the current HDMI version is version 2.0, the flow goes to S1304; if the current HDMI version is version 2.1, the flow goes to S1305.

S1303: Reading standard timing of version 1.4, and then the flow goes to S1306.

S1304: Reading standard timing of version 2.0, and then the flow goes to S1306.

S1305: Reading standard timing of version 2.1, and then the flow goes to S1306.

S1306: Lowering, by the display apparatus, a hotplug voltage to notify an external device to read EDID information.

After the user can control to switch the viewing angle ratio through a first command or switch the interface protocol version through a second command, the display apparatus 200 can first determine the current HDMI version and combine the current HDMI version with the switched viewing angle ratio included in the first command, and then update the corresponding standard timing data to EDID information. In this case, the display apparatus 200 can automatically lower the hotplug voltage to notify the external device 500 to prepare to read the EDID information. The EDID information is then sent to the external device 500 for the external device 500 to read.

S1307: Setting, by the display apparatus, a delay of a preset time, for example, 800 ms.

S1308: Lowering, by the display apparatus, the hotplug voltage to notify the external device to return a multimedia content.

Here, it generally takes a certain amount of time for the external device 500 to read the EDID information. Therefore, the display apparatus 200 can set a delay time like 800 ms and then lower the hotplug voltage again to notify the external device 500 to switch the multimedia content type to be returned, that is, switch the resolution or frame rate of the image corresponding to the video signal and send a new video signal so that the display apparatus 200 can perform subsequent display work according to the switched video signal.

S1309: Determining whether the resolution is a predetermined value; if the resolution is the predetermined value, the flow goes to S1310; if the resolution is not the predetermined value, the flow goes to S1311.

S1310: Performing subsequent image display work.

S1311: Restoring standard timing data.

Here, since some external devices 500 do not support multiple viewing ratio signal output, these external devices 500 may still maintain the original multimedia content form for return after the display apparatus 200 sends EDID information. After the display apparatus 200 switches the viewing angle ratio, the display apparatus 200 may display the image using a new viewing angle ratio. In this case, the multimedia content returned from the external device 500 does not adapt to the display mode of the display apparatus 200, causing problems such as failure to display or abnormal display.

In order to reduce problems like being unable to display or displaying abnormally, in some embodiments, the display apparatus 200 can detect the image corresponding to the multimedia content after the external device 500 returns the multimedia content to determine whether the multimedia content is suitable for the switched viewing angle ratio. That is, during controlling the display to display the multimedia content, the display apparatus 200 can extract an identification frame image from the multimedia content and detect a resolution of the identification frame image.

The identification frame image may be a frame of an image among multiple frames of display images obtained after the display apparatus 200 decodes the multimedia content. The display apparatus 200 can determine a resolution corresponding to the multimedia content based on the number of pixels contained in the frame of the image in width and height directions. In order to reduce the impact of the display content on the resolution detection result, during the process of extracting the identification frame image, the display apparatus 200 can extract multiple frames of images at intervals from the decoding result of the multimedia content, and perform resolution detection on each of the multiple frames, to determine the resolution corresponding to the multimedia content.

After detecting the resolution of the identification frame image, the display apparatus 200 may compare the resolution of the identification frame image with the switched viewing angle ratio. If the resolution of the identification frame image is equal to the resolution of the switched viewing angle ratio, that is, the multimedia content returned from the external device 500 to the display apparatus 200 conforms to the switched viewing angle ratio, then the multimedia content can be displayed according to the switched viewing angle ratio. If the resolution of the identification frame image is not equal to the resolution of the switched viewing angle ratio, that is, the multimedia content returned from the external device 500 to the display apparatus 200 does not conform to the switched viewing angle ratio, then the display apparatus 200 can modify the identification data in the declaration information to the identification data before switching, to display the multimedia content based on the viewing angle ratio before switching.

Since some general-purpose 16:9 can display cannot display wide viewing angle images, for example, when an image with a wide viewing angle ratio (21:9 or 32:9) is sent to the display apparatus 200, the display apparatus 200 with the physical size of 16:9 stretches the input image in a vertical direction to fill the entire display region, which causes distortion for the image content.

Therefore, in some embodiments, an algorithm can also be designed to set the output size of the display apparatus 200 and dynamically adjust the size of the display window according to the aspect ratio of the input signal. That is, during controlling the display to display the multimedia content, the display apparatus 200 may first detect the physical size of the display, including the screen width and screen height; and meanwhile obtain the image size of the multimedia content, including the image width and image height, and then construct a virtual screen based on the physical size and the image size, and display the multimedia content according to the virtual screen.

Here, an aspect ratio of the constructed virtual screen is equal to the target image display ratio of the multimedia content; a width of the virtual screen is equal to the screen width of the display, a height of the virtual screen is equal to a multiple (times) of a scaling ratio of the screen height, and the scaling ratio is equal to a ratio of the image height to the screen height.

Figure 14:
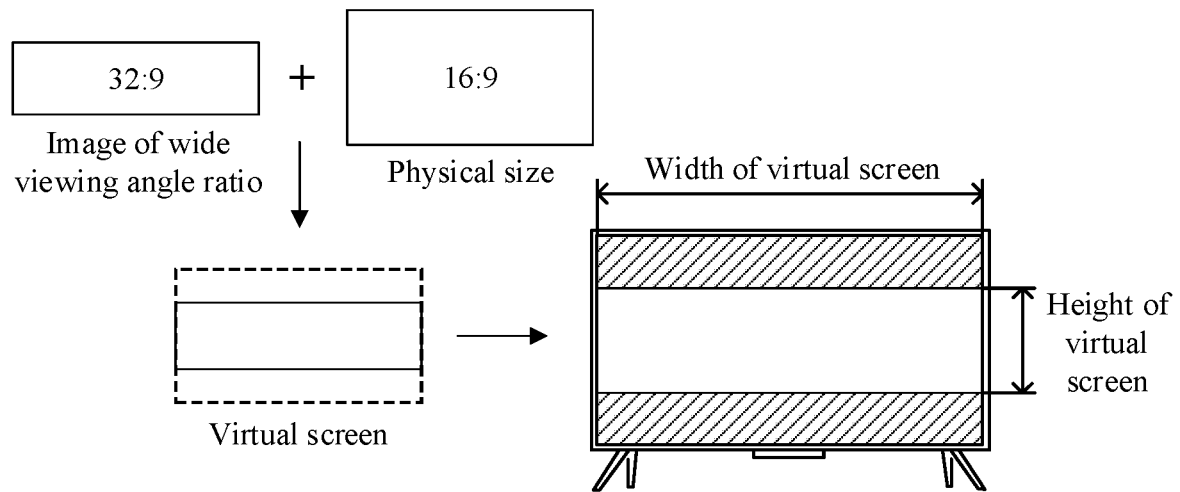
FIG. 14 is a schematic flowchart of displaying a wide-view image through a virtual screen according to some embodiments.

For example, as shown in FIG. 14, the physical size of the display apparatus 200 is 16:9 (3840×2160), and when an input signal of an image with a wide viewing angle ratio of 32:9 (3840×1080) is sent to the display apparatus 200, the display apparatus 200 can construct a virtual screen and dynamically calculate a size of the virtual screen according to an aspect ratio of the input signal, and finally display the virtual screen on a center of the display to ensure that the image is displayed normally according to the original viewing angle ratio. Here, the width of the virtual screen (Uu32Width) is equal to the actual width of the physical screen of the display; the height of the virtual screen (Uu32Height) is equal to a multiple of 1080/2160 of the physical screen; the x-axis coordinate (Uu32X) of the upper left corner of the virtual screen is equal to 0, which means it is located on the far left of the screen; the y-axis coordinate (Uu32Y) of the upper left corner of the virtual screen is calculated based on the known width of the virtual screen displayed along the horizontal center position of the screen, that is, Uu32Y=(2160−1080)/2.

Figure 15:
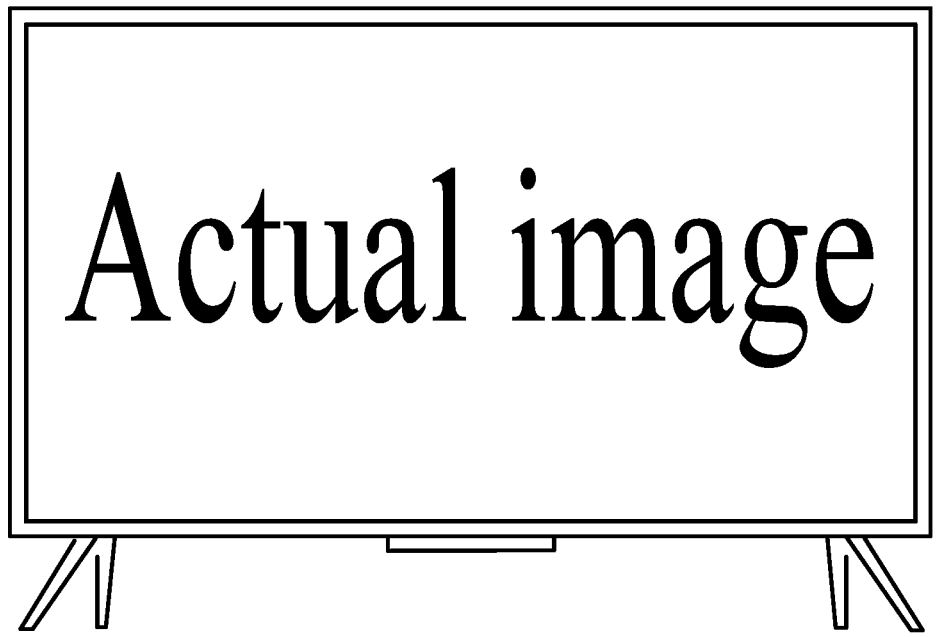
FIG. 15 is a schematic diagram of the effect of displaying an actual image through stretching according to some embodiments.
Figure 16:
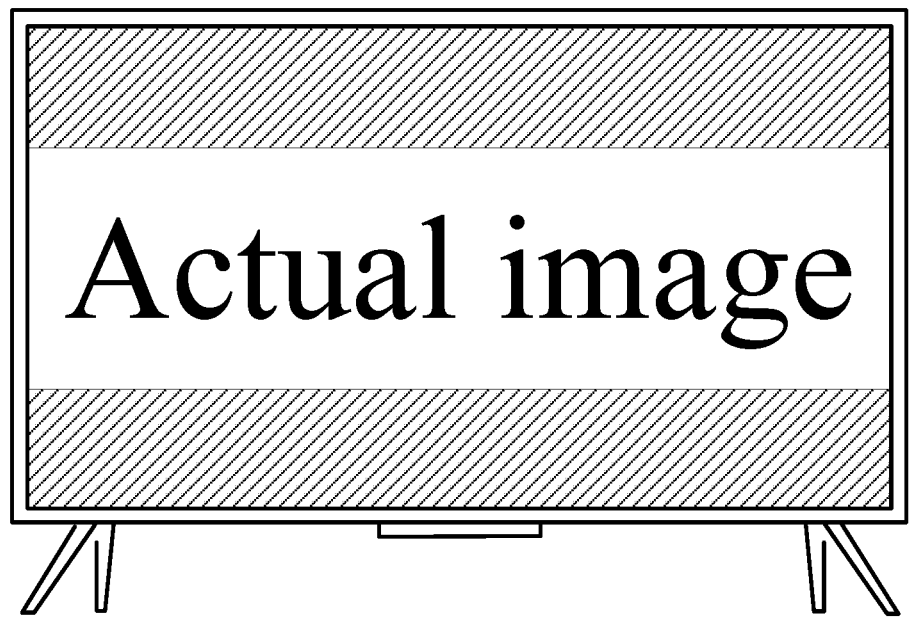
FIG. 16 is a schematic diagram of the effect of displaying an actual image through a virtual screen according to some embodiments.

It can be seen that since the physical size of the display apparatus 200 is 16:9, when the image with the wide viewing angle (21:9\32:9) is sent to the display apparatus 200, the display apparatus 200 can stretch the input image in the vertical direction according to the original video output method to fill the entire display region, as shown in FIG. 15. This display method can cause distortion of the image content. According to the display method provided in the above embodiments, the display apparatus 200 introduces a virtual screen and dynamically calculates the size of the virtual screen according to the aspect ratio of the input signal, and finally can display the virtual screen on the center of the physical screen, as shown in FIG. 16, ensuring that the image is displayed properly according to the original ratio.

Figure 17:
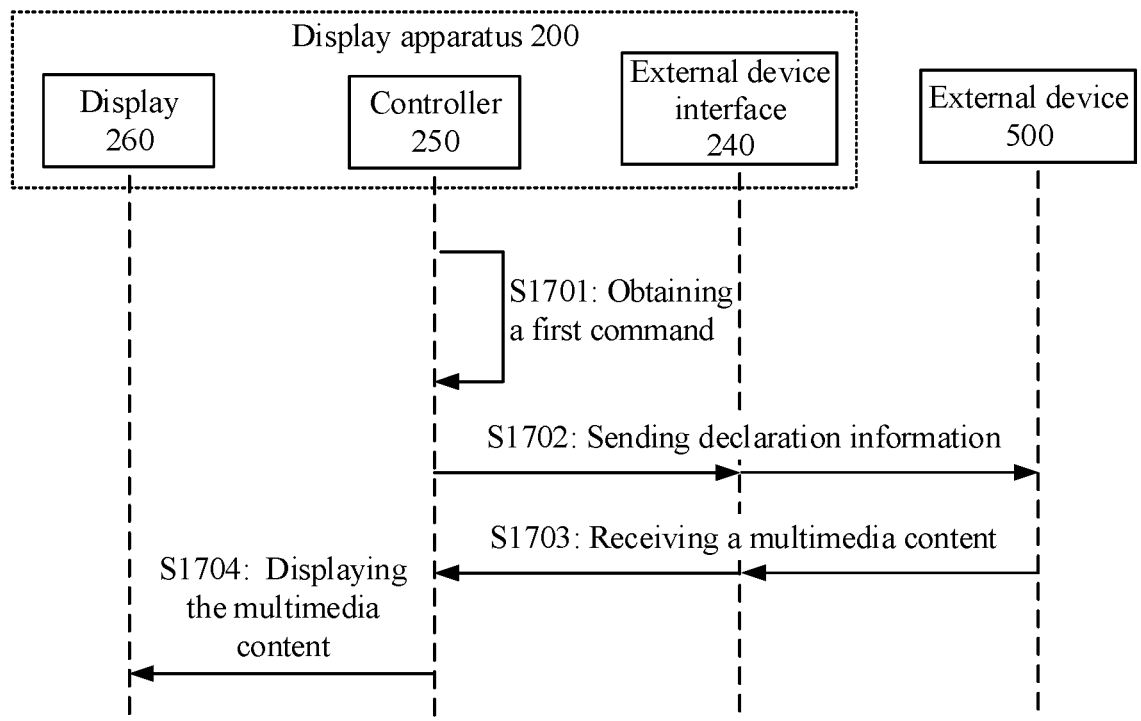
FIG. 17 is a timing diagram of a display process at a display apparatus side according to some embodiments.

Based on the above display method, some embodiments of the present disclosure provide a display apparatus 200, the display apparatus 200 can include: a display, an external device interface 240, and a processor 250. Here, the display is configured to execute instructions to cause the display apparatus to display an image and/or a user interface; the external device interface 240 is configured to execute instructions to cause the display apparatus to connect an external device 500; as shown in FIG. 17, the processor 250 can be configured to execute instructions to cause the display apparatus to perform following steps.

S1701: Obtaining a first command input from a user for switching a viewing angle ratio.

S1702: sending declaration information to the external device in response to the first command, where the declaration information can include identification data that conforms to a protocol version of the external device interface and a switched viewing angle ratio.

S1703: Receiving a multimedia content returned from the external device in response to the declaration information, where a target image display ratio of the multimedia content is equal to the switched viewing angle ratio.

S1704: Controlling the display to display the multimedia content.

Figure 18:
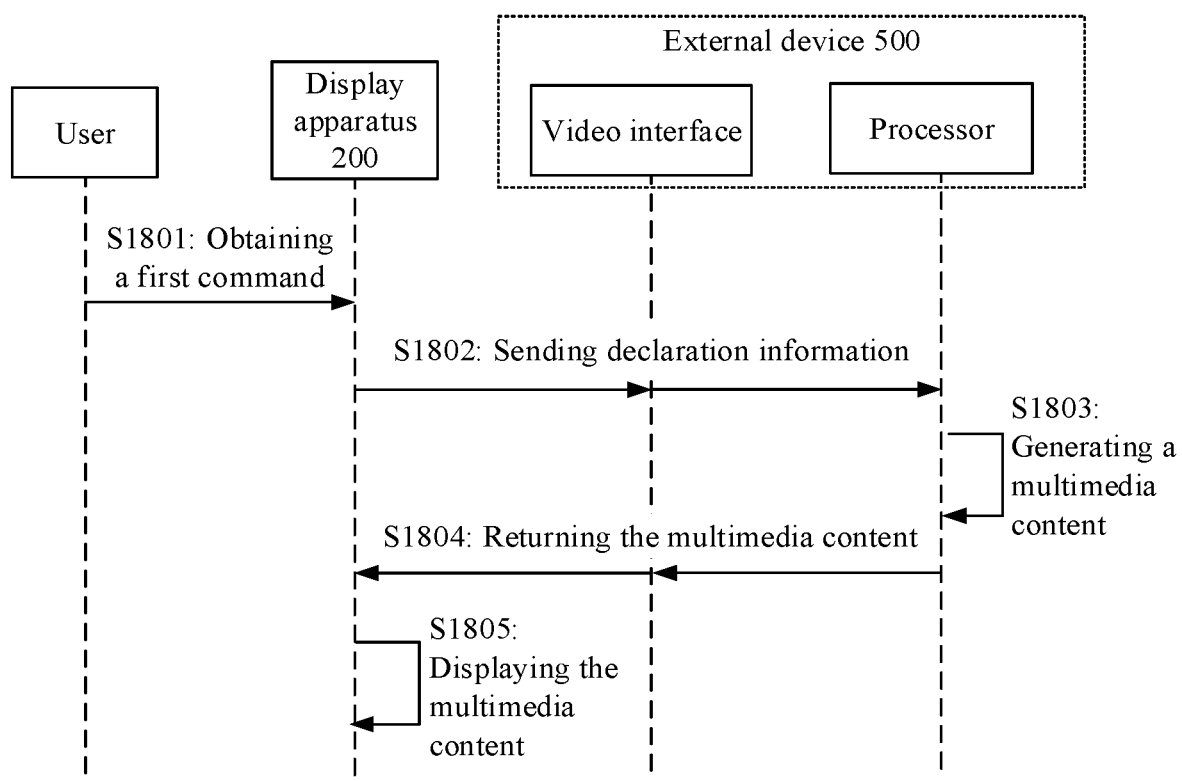
FIG. 18 is a timing diagram of a data return process at an external device side according to some embodiments.

In adaption to the display apparatus 200, some embodiments of the present disclosure further provide an external device 500, the external device 500 can include: a video interface and a processor. Here, the video interface is configured to execute instructions to cause the display apparatus to connect to a display apparatus; as shown in FIG. 18, the processor can be configured to execute instructions to cause the display apparatus to perform following steps.

S1801: Obtaining, by the display apparatus, a first command for switching a viewing angle ratio.

S1802: Sending, by the display apparatus, declaration information to the external device in response to the first command.

S1803: Obtaining, by the external device, the declaration information sent from the display apparatus and generating a multimedia content, where the declaration information can include identification data that conforms to a protocol version of an external device interface of the display apparatus and a switched viewing angle ratio.

S1804: Returning, by the external device, the multimedia content to the display apparatus according to the identification data.

S1805: Displaying, by the display apparatus, the multimedia content according to the switched viewing angle ratio.

The display apparatus 200 provided in the above embodiments can send declaration information to the external device 500 according to a command input from the user when the user switches the viewing angle ratio, so as to inform the external device 500 of the viewing angle ratio currently supported by the display apparatus 200, and receive the multimedia content returned from the external device 500 in response to the declaration information, and display the received multimedia content according to the switched viewing angle ratio. The display apparatus 200 sends currently supported viewing angle ratio(s) to the external device 500 through the declaration information, and the declaration information can include identification data that conforms to the protocol version of the external device interface 240 and the switched viewing angle ratio, so that the external device 500 can return the multimedia content which is adapt to both of the protocol version and the viewing angle ratio supported by the display apparatus 200, thereby reducing problems such as no signal input at some viewing angle ratios.

It should be noted that the above embodiments use ratios of 16:9, 21:9, and 32:9 as examples to describe the viewing angle ratio and screen size for the multi-view display method. The above ratios are only used as examples and do not limit the application scope of the present disclosure. According to different types of the display apparatus 200 and the external device 500, other specific target image display ratios may also be applied during the actual display process. Similarly, in the above embodiments, the declaration information and identification data are also described using the EDID information of HDMI 2.1 version, which is also only used as an example and does not limit the data transmission process between the display apparatus 200 and the external device 500. In actual applications, specific protocol versions and connection methods used by the display apparatus 200 and the external device 500 can also be selected and determined according to specific circumstances.

To facilitate understanding, in some other embodiments, the display apparatus and display method provided by the present disclosure will be discussed below.

Different multimedia contents can be played on the display apparatus. The multimedia contents played on the display apparatus can include: tutorial videos, singing videos, dancing videos, game videos, etc. A user can interact with the display apparatus to watch the multimedia contents on the display apparatus, or has immersive experience of other data content (such as game experience), thus enriching the user's spare time life.

Here, when the user interacts with the display apparatus, the user interacts with the display apparatus in different postures. For example, when the user experiences game scenarios on the display apparatus, the user generally uses a sitting or standing posture to watch the display apparatus. Different viewing angle will affect the user's viewing effect of the multimedia content. Specifically, the user's viewing angle may form a certain angle with the display apparatus, which is not within the optimal viewing angle range of the display apparatus, or the user's face position is not within the central region of the display apparatus, which makes it difficult for the user to optimally experience the game scenarios from the best viewing angle or position.

In the related art, when the user adjusts his/her posture and viewing angle, the user can adjust the display ratio of different images by using a control function on the display apparatus. As a result, the user needs to repeatedly adjust the ratio according to different viewing angles when watching the multimedia content, thus affecting the user's viewing effect. The user can manually adjust a display mode of the display apparatus through an adjustment button on a controller/display apparatus to select a suitable image display ratio/image display position. Therefore, the manual adjustment method may affect the user's content viewing, and especially in game scenarios, it may directly affect the user's game experience and further reduce the user's device experience.

Considering the above problems, in some embodiments of the present disclosure, the display apparatus can collect its corresponding surrounding image, determine an image region corresponding to a human face included in the surrounding image, and determines a target display mode of the multimedia content based on an initial display mode of the multimedia content and a positional relationship between the image region corresponding to the human face and the surrounding image, where the target display mode is used for describing a target image display ratio of the multimedia content and/or a target image display position of the multimedia content, thereby displaying the multimedia content based on the target display mode. The above method can determine the adaptive display mode of the multimedia content based on the user's different postures when the user watches the multimedia content, always maintain the best match between the display image of the multimedia content and the viewing angle of the user's eyes, and improve the user's viewing satisfaction and viewing effect.

Figure 19:
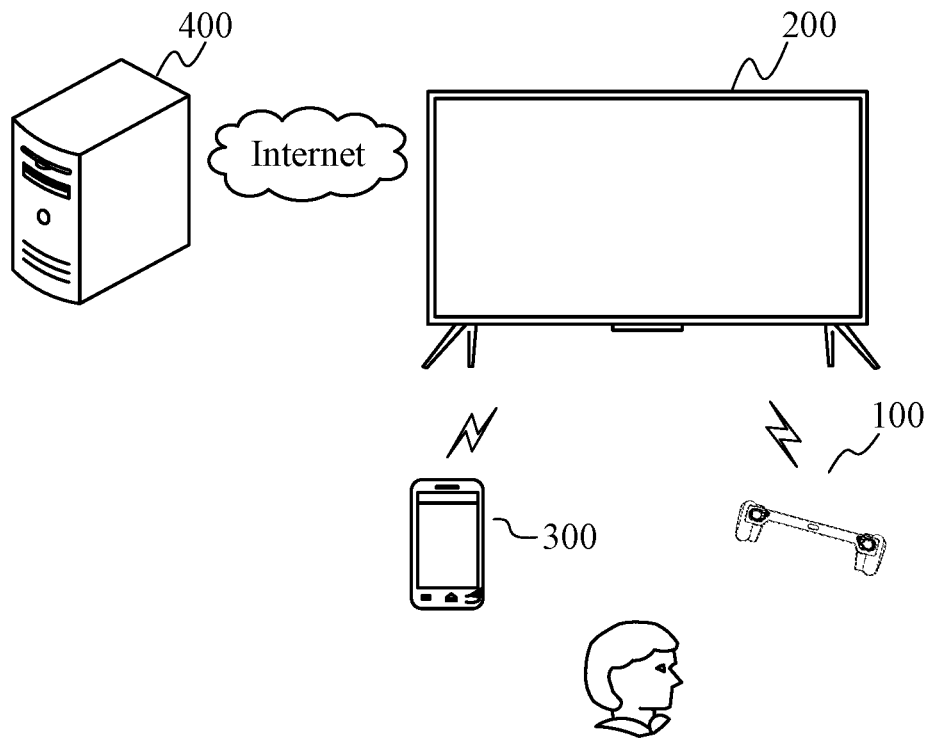
FIG. 19 is a schematic diagram of an operation scenario between a display apparatus and a control device according to some embodiments.

FIG. 19 is a schematic diagram of an operation scenario between a display apparatus and a control device according to some embodiments. As shown in FIG. 19, the user can operate the display apparatus 200 through a smart device 300 (such as a mobile phone) or the control device 100 (such as a joy stick/mouse/keyboard/remote control), so that the display apparatus 200 plays the corresponding multimedia content. The display apparatus 200 can adjust the image display ratio and image display position for the multimedia content played on the display apparatus 200 based on the user's posture, so that the multimedia content can be played on the display apparatus 200 in different image display ratios, or the multimedia content can be played in different play regions on the display apparatus 200 in a corresponding image display ratio. The display apparatus 200 can divide the display region into multiple image display positions for playing the multimedia content. The image display ratio played on the display apparatus 200 can be an aspect ratio of the play image of the display apparatus. Specifically, the image display ratios that can be played on the display apparatus 200 may include: 32:9, 21:9 and 16:9 (full-screen play).

In some embodiments, the user can turn on the display apparatus and control the multimedia content played on the display apparatus through the remote control. The display apparatus can adjust the image display ratio and image display position of the multimedia content accordingly according to the user's posture.

For example, the display region of the display image of the display apparatus may include: a first region, a second region and a third region. The first region can be located above the second region, and the second region can be located above the third region. When it is detected that the user's eyes fall within the first region, the image display region of the multimedia content can be adjusted to the first region for display. When it is detected that the user's eyes fall within the second region, the image display region of the multimedia content can be adjusted to the second region for display. When it is detected that the user's eyes fall within the third region, the image display region of the multimedia content can be adjusted to the third region for display. In addition, when it is detected that an angle between the user's eyes and the display apparatus in a vertical direction is less than or equal to 30°, the image display ratio of the multimedia content can be adjusted to 32:9. When it is detected that the angle between the user's eyes and the display apparatus in the vertical direction is greater than 30° and less than 45°, the image display ratio of the multimedia content is adjusted to 21:9. When it is detected that the angle between the user's eyes and the display apparatus in the vertical direction is greater than 45°, the image display ratio of the multimedia content is adjusted to 16:9. Therefore, problems in the related art are addressed, it is able to determine an adaptive display mode of the multimedia content based on the user's different postures when the watches the multimedia content, the best match between the display image of the multimedia content and the viewing angle of the user's eyes is always maintained, and the user's viewing satisfaction and viewing angle effect are improved.

In some embodiments, the control device 100 may be a remote controller, and the communication between the remote controller and the display apparatus can include infrared protocol communication, Bluetooth protocol communication, wireless or other wired methods to control the display apparatus 200. The user can control the display apparatus 200 by inputting a user command through a button on the remote control, voice input, and control panel input. In some embodiments, as mentioned above, a mobile terminal, a tablet, a computer, a laptop, and other smart devices can also be used to control the display apparatus 200.

In some embodiments, the control device 100 may also be a mouse/keyboard/joy stick, and the communication between the mouse/keyboard/joy stick and the display apparatus may include infrared protocol communication, Bluetooth protocol communication, wireless or other wired methods to control the display apparatus 200. The user can control the display apparatus 200 by inputting a user command through a button on the mouse/keyboard/joy stick, voice input, control panel input, etc.

In some embodiments, the display apparatus 200 may not use the above-mentioned smart device or control device to receive commands, but may receive the user's control through touch or gestures.

In some embodiments, the display apparatus 200 can also be controlled in a manner other than the control device 100 and the smart device 300, for example, through voice command control.

In some embodiments, the smart device 300 can communicate with a software application installed in the display apparatus 200 through a network communication protocol to achieve one-to-one control operations and data communication purposes.

Figure 20:
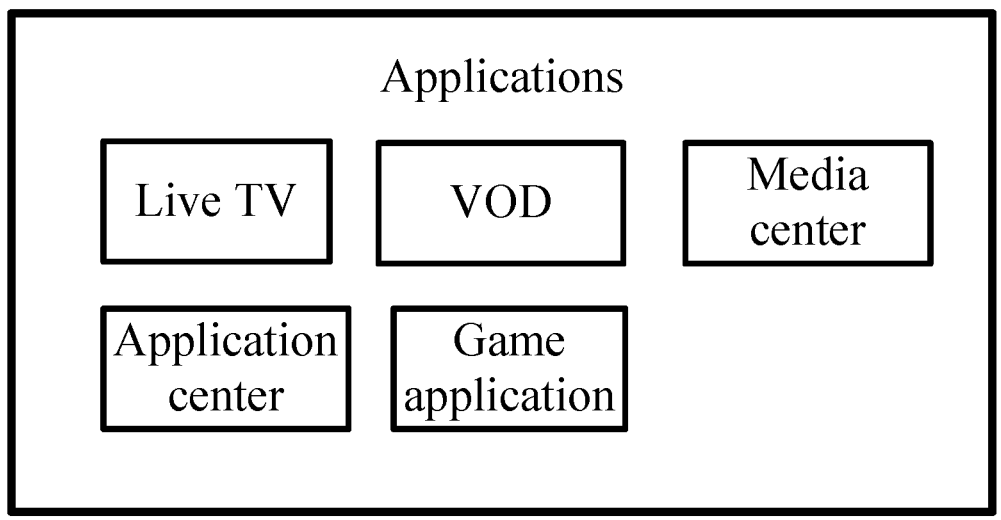
FIG. 20 is a display schematic diagram of an icon interface of an application in a display apparatus 200 according to some embodiments.

FIG. 20 is a schematic diagram showing an icon interface of an application in a display apparatus 200 according to some embodiments. As shown in FIG. 20, the application layer can include at least one application that can display the corresponding icon on the display, such as: a live TV application icon, a video on demand application icon, a media center application icon, an application center icon, a game application icon, etc. The live TV application can provide live TV from different sources. The video on demand application can provide videos from different storage sources. Unlike the live TV applications, the video on demand offers the display of videos from certain storage sources. The media center application can provide various multimedia content play applications. The application center can provide storage for various applications.

In some embodiments, the above-mentioned display apparatus is a terminal device with a display function, such as a television. The display apparatus can include following components.

In some embodiments, a processor 250 can control the operation of the display apparatus and respond to user operations through various software programs stored in the memory. The processor 250 can control the overall operation of the display apparatus 200. The user may input a user command into a graphical user interface (GUI) displayed on the display, and the user input interface receives the user input command through the graphical user interface (GUI). Alternatively, the user can input a user command by inputting a specific sound or gesture, and the user input interface can recognize the sound or gesture through a sensor to receive the user input command.

An output interface (display, and/or audio output interface 270) can be configured to execute instructions to cause the display apparatus to output user interaction information.

A communicating device 220 can be configured to execute instructions to cause the display apparatus to communicate with a server 400.

An image collection interface 290 can be configured to execute instructions to cause the display apparatus to collect a surrounding image around the display apparatus.

The processor 250 can be configured to execute instructions to cause the display apparatus to determine a target display mode of a multimedia content to be displayed based on a user's control. The target display mode can be used for describing a target image display ratio of the multimedia content and/or a target image display position of the multimedia content, for controlling the display to display the multimedia content based on the target display mode.

In some embodiments, the processor 250 can be configured to execute instructions to cause the display apparatus to determine an image region corresponding to a human face based on the surrounding image.

Based on an initial display mode of the multimedia content and a positional relationship between the image region corresponding to the human face and the surrounding image, the target display mode of the multimedia content can be determined. The target display mode can be used for describing the target image display ratio of the multimedia content and/or the target image display position of the multimedia content.

The display can be configured to execute instructions to cause the display apparatus to display the multimedia content based on the target display mode.

In some embodiments, the positional relationship between the image region corresponding to the human face and the surrounding image can include: a relative angle relationship, the relative angle relationship can be angle information between the image region and a center point of the surrounding image in a first direction. The processor 250 can be further configured to execute instructions to cause the display apparatus to obtain an initial image display ratio included in the initial display mode, and determine the target image display ratio of the multimedia content based on the initial image display ratio and the angle information included in the positional relationship.

In some embodiments, the processor 250 can be further configured to execute instructions to cause the display apparatus to determine that the initial image display ratio is a preset image display ratio, and determine that the angle information included in the positional relationship changes. The preset image display ratio can be a corresponding image display ratio when the display apparatus is in a full-screen display state. The target image display ratio of the multimedia content can be determined based on the angle information included in the positional relationship.

In some embodiments, the processor 250 can be further configured to execute instructions to cause the display apparatus to: determine the target image display ratio of the multimedia content to be a first display ratio in response to the angle information being within a first preset angle range; or, determine the target image display ratio of the multimedia content to be a second display ratio in response to the angle information being within a second preset angle range; or, determine the target image display ratio of the multimedia content to be a third display ratio in response to the angle information being within a third preset angle range.

In some embodiments, the positional relationship between the image region corresponding to the human face and the surrounding image can include: a relative vertical relationship, where the relative vertical relationship is a distance between the image region and the surrounding image in a second direction. The processor 250 can be further configured to execute instructions to cause the display apparatus to obtain the initial image display ratio included in the initial display mode and determine the target image display position of the multimedia content according to the initial image display ratio and the distance included in the positional relationship.

In some embodiments, the processor 250 can be further configured to execute instructions to cause the display apparatus to: determine that the initial image display ratio is not a preset image display ratio, and determine that the distance included in the positional relationship changes, the preset image display ratio is a corresponding image display ratio when the display apparatus is in a full-screen display state; determine the target image display position of the multimedia content according to the distance included in the positional relationship.

In some embodiments, the processor 250 can be further configured to execute instructions to cause the display apparatus to: determine the target image display position of the multimedia content to be a first display position based on that the distance is within a first preset distance range; or, determine the target image display position of the multimedia content to be a second display position based on that the distance is within a second preset distance range; or, determine the target image display position of the multimedia content to be a third display position based on that the distance is within a third preset distance range.

In some embodiments, the processor 250 can be further configured to execute instructions to cause the display apparatus to: check the target image display ratio based on a preset image display ratio, where the preset image display ratio is a corresponding image display ratio when the display apparatus is in a full-screen display state; and determine the target image display ratio to be the preset image display ratio.

In some embodiments of the present disclosure, the display apparatus can collect its corresponding surrounding image, can determine the image region corresponding to the human face included in the surrounding image, and can determine the target display mode of the multimedia content based on the initial display mode of the multimedia content and the positional relationship between the image region corresponding to the human face and the surrounding image, where the target display mode is used for describing the target image display ratio of the multimedia content and/or the target image display position of the multimedia content, so as to display the multimedia content based on the target display mode. The above method can determine the adaptive display mode of the multimedia content based on the user's different postures when the user watches the multimedia content, always maintain a better match between the display image of the multimedia content and the viewing angle of the user's eyes, and improve the user's viewing satisfaction and viewing angle effect.

Figure 21A:
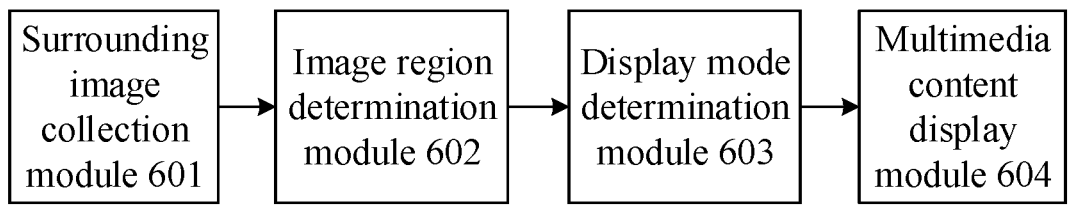
FIG. 21A is a framework diagram of a system for displaying a multimedia content according to some embodiments.

FIG. 21A is a framework diagram of a system for displaying a multimedia content according to some embodiments. As shown in FIG. 21A, the system may include a surrounding image collection module 601, an image region determination module 602, a display mode determination module 603 and a multimedia content display module 604. The system can collect a surrounding image corresponding to a display apparatus through the surrounding image collection module 601. The image region determination module 602 can find an image region corresponding to a human face from the surrounding image, and then the display mode determination module 603 can determine a target display mode of a multimedia content based on an initial display mode of the multimedia content, and a positional relationship between the image region corresponding to the human face and the surrounding image. The target display mode can be used for describing a target image display ratio of the multimedia content and/or a target image display position of the multimedia content, that is, the target display mode may include: a target image display ratio and/or a target image display position of the multimedia content. The target image display ratio can be an aspect ratio of a display image of the multimedia content displayed on the display apparatus, and the target image display position can be a display region of the display image of the multimedia content displayed on the display apparatus on a play image of the display apparatus, and the target image display ratio and target image display position of the multimedia content adapted to the user's face can be determined based on different postures of the user face. The multimedia content display module 604 can display the multimedia content based on the target display mode. Therefore, it is able to determine an adaptive display mode of the multimedia content based on the user's different postures, it is ensured that the user can browse the multimedia content with the uniform effect in different postures, a desirable match between the display image and the viewing angle of the user's eyes can be always maintained, and the user's browsing experience can be improved.

Figure 21B:
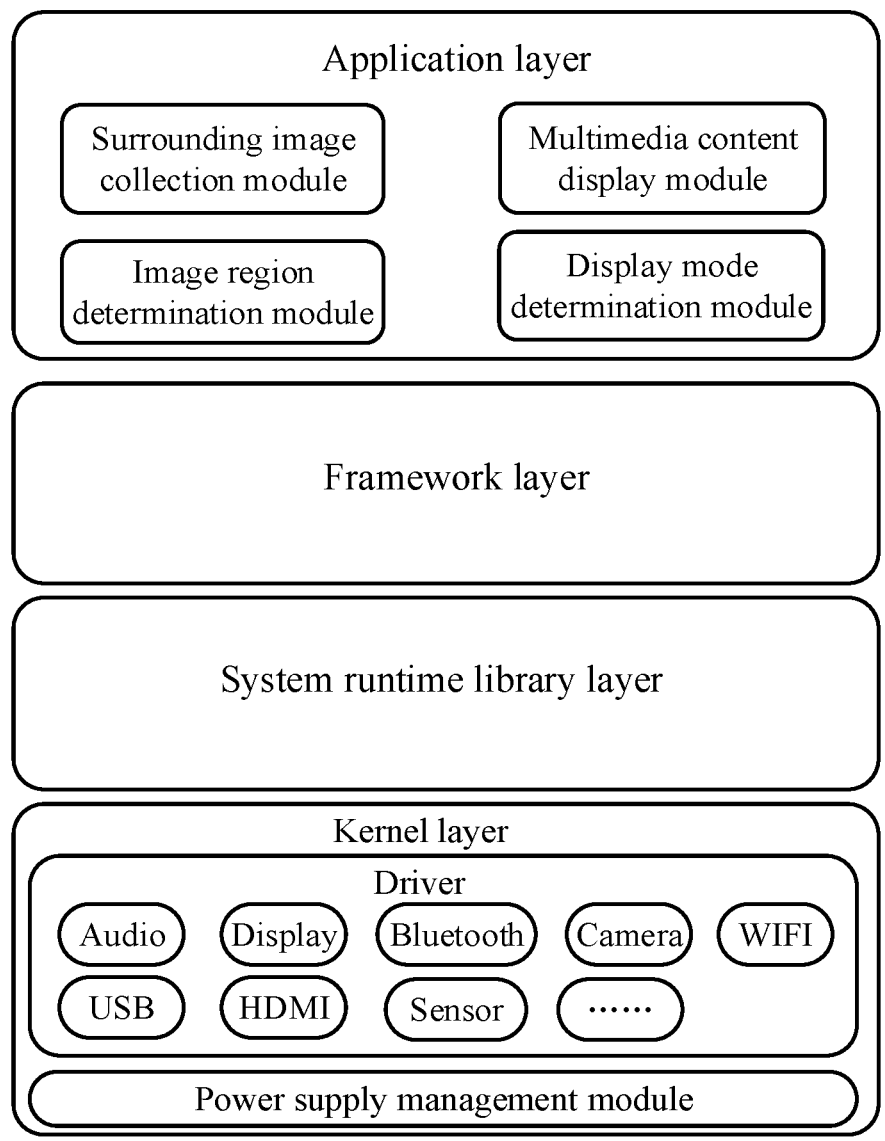
FIG. 21B is an architectural diagram of displaying a multimedia content according to some embodiments.

FIG. 21B is an architectural diagram of displaying a multimedia content according to some embodiments. Based on the above system framework, embodiments of the present disclosure in the Android system are shown in FIG. 21B. The Android system mainly can include an application layer, a framework layer, a system runtime layer and a kernel layer. The implementation logic can be mainly reflected in the application layer, which can include a surrounding image collection module, an image region determination module, a display mode determination module and a multimedia content display module.

The display method provided in some embodiments of the present disclosure can collect the surrounding image corresponding to the display apparatus, find the image region of the human face included in the surrounding image, and use the initial display mode of the multimedia content and the positional relationship between the image region of the human face and data image to determine the final image display ratio and/or the final image display position of the multimedia content to be displayed on the display apparatus, and display the multimedia content on the display apparatus using the final image display ratio and/or the final image display position. The above method can determine the adaptive display mode of the multimedia content based on the user's different postures when the user watches the multimedia content, always maintain a best match between the display image of the multimedia content and the viewing angle of the user's eyes, and improve the user's viewing satisfaction and viewing angle effect.

The following description will be made in conjunction with FIG. 22A. It can be understood that the steps involved in FIG. 22A may include more steps or fewer steps when actually implemented, and the order between these steps may also be different as along as the display method provided in embodiments of the present disclosure can be implemented, and are not limited by embodiments of the present disclosure.

Figure 22A:
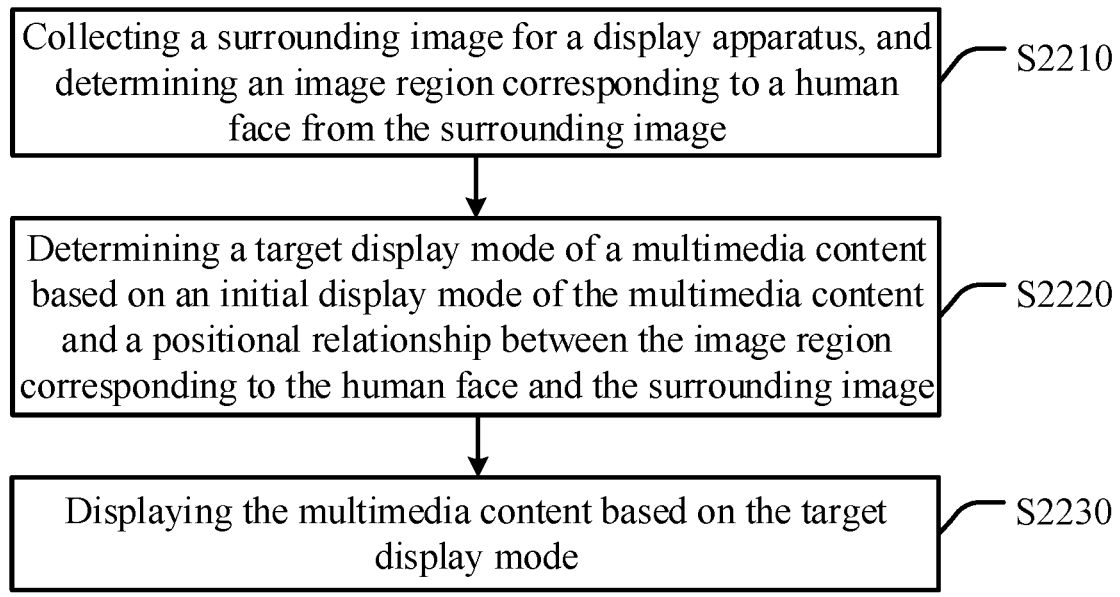
FIG. 22A is a schematic flowchart of a display method according to some embodiments.

As shown in FIG. 22A, FIG. 22A is a schematic flowchart of a display method according to some embodiments. The display method can include following steps.

S2210: Collecting a surrounding image for a display apparatus, and determining an image region corresponding to a human face from the surrounding image.

Here, a surrounding image of the display apparatus can be collected through an image collection interface based on a camera device to obtain the surrounding image, and the collected surrounding image can be sent to the display apparatus by the camera device through a communication connection between the image collection interface and the display apparatus, so that the display apparatus can obtain the surrounding image.

It should be noted that the camera device can be an image collection unit built into the display apparatus, arranged inside the display apparatus through an image collection interface, and can capture surrounding or environmental images of the display apparatus in real time while the display apparatus is playing the display image, or the camera device can be a camera external to the display apparatus, connected with the display apparatus through an image collection interface, and can be connected with the display apparatus through a wired or wireless connection to collect surrounding images of the display apparatus while the display apparatus is playing the display image.

Here, the display apparatus can start a working thread after checking that the camera device is available, and instruct the camera device to capture surrounding images of the display apparatus in real time at a collection speed of one frame per second, and the camera device can send the collected surrounding image to the display apparatus. The processor of the display apparatus can process the surrounding image according to a model to mark the image region corresponding to a human face.

Figure 22B:
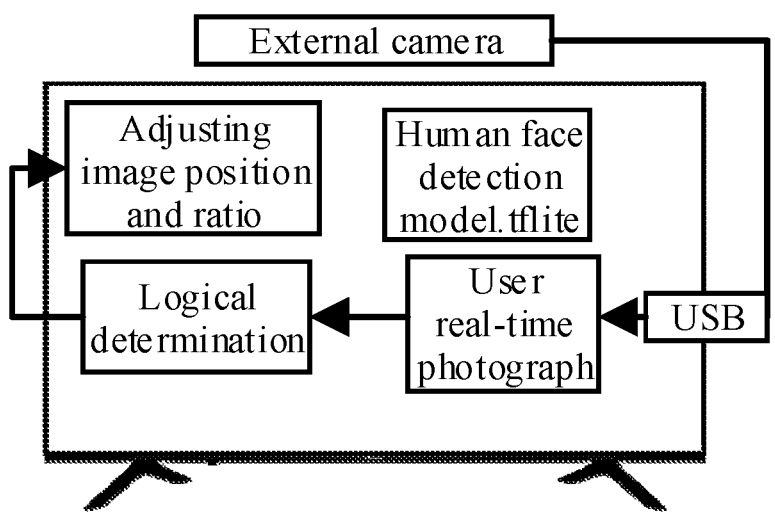
FIG. 22B is an overall framework diagram of a system corresponding to a display method according to some embodiments.

As shown in FIG. 22B, the TV (display apparatus) can have an external camera device (external camera) and connected with the camera device through a Universal Serial Bus (USB) to capture the environment in front of the TV in real time. The obtained images can be converted into jpeg files→bitmap data→bytebuffer data in turn and sent to a machine learning model in tflite format stored in the processor. The machine learning model can match facial features. If it is found that there is a facial feature in the image, the facial feature is selected to form a rectangular region with a frame or box, and corresponding four vertex coordinates of the rectangular region are determined.

S2220: Determining a target display mode of a multimedia content based on an initial display mode of the multimedia content and a positional relationship between the image region corresponding to the human face and the surrounding image.

The initial display mode of the multimedia content may be used for describing the current image display ratio corresponding to the multimedia content and/or the current image display position of the multimedia content. That is, the initial display mode corresponding to the multimedia content may include: the current image display ratio, or the current image display position, or the current image display ratio and the current image display position.

The current image display ratio corresponding to the multimedia content can be the aspect ratio of the corresponding region of the current display image, which may include: a first display ratio, a second display ratio, and a third display ratio. Specifically, the first display ratio may be 16:9, the second display ratio may be 21:9, and the third display ratio may be 32:9. The current display image corresponding to 16:9 can be the full-screen display of the display apparatus, and the current display image corresponding to 21:9 and 32:9 can be the non-full screen display of the display apparatus.

Figure 22C:
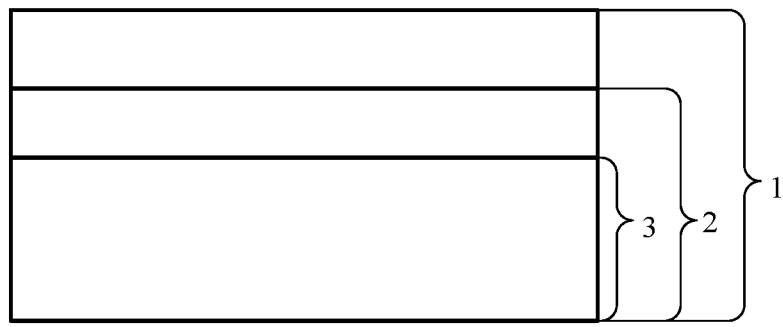
FIG. 22C is a schematic diagram of an interface with different image display ratios of a multimedia content according to some embodiments.

As shown in FIG. 22C, the display region of the first display ratio corresponds to the display region 1 of the display apparatus, the display region of the second display ratio corresponds to the display region 2 of the display apparatus, and the display region of the third display ratio corresponds to the display region 3 of the display apparatus.

The current image display position corresponding to the multimedia content is the display position of the corresponding region of the current display image in the display apparatus. Specifically, the display apparatus can split the display screen into multiple display positions, and each display position can correspond to a display region, such as, the display apparatus splits the display screen into three display regions, which may respectively include: a first display region, a second display region, and a third display region.

Figure 22D:
FIG. 22D is a schematic diagram of an interface with different image display positions of a multimedia content according to some embodiments.

As shown in FIG. 22D, the first display position may correspond to a display region 4, which may correspond to the upper display region of the display apparatus, the second display position may correspond to a display region 5, which may correspond to the middle display region of the display apparatus, and the third display position may correspond to a display region 6, which may correspond to the lower display region of the display apparatus.

Here, the positional relationship between the image region corresponding to the human face and the surrounding image can be an angle value and a vertical distance between the image region corresponding to the human face and the surrounding image. The angle value can be used to reflect the viewing angle of the user viewing the display apparatus, and the vertical distance can be used to reflect the vertical displacement between the user and the display apparatus when the user watches the display apparatus.

The target display mode may be used for describing the target image display ratio of the multimedia content and/or the target image display position of the multimedia content. That is, the target display mode corresponding to the multimedia content may include: the target image display ratio, or the target image display position, or, the target image display ratio and the target image display position.

In conjunction with the above example, the target display mode may include the above-mentioned first display ratio, or the second display ratio (/third display ratio) and the first display position, or the second display ratio (/third display ratio) and the second display position, or the second display ratio (/third display ratio) and the third display position, etc.

Here, the target display mode is the first display ratio, which means that the multimedia content is displayed in a full-screen state on the display apparatus, and the target display mode is the second display ratio (/third display ratio) and the first display position, which means that the multimedia content is displayed in the display region with the image size corresponding to the display region 2 (or the image size corresponding to the display region 3) on the display apparatus.

The target display mode is the second display ratio (/third display ratio) and the second display position, which means that the multimedia content is displayed in the display region 5 with the image size corresponding to the display region 2 (or the image size corresponding to the display region 3) on the display apparatus. The size of the display image is the image size corresponding to the display region 2 (or the image size corresponding to the display region 3).

The target display mode is the second display ratio (/third display ratio) and the third display position, which means that the multimedia content is displayed in the display region 6 with the image size corresponding to the display region 2 (or the image size corresponding to the display region 3) on the display apparatus. The size of the display image is the image size corresponding to the display region 2 (or the image size corresponding to the display region 3).

S2230: Displaying the multimedia content based on the target display mode.

The display apparatus may display the multimedia content based on the target image display ratio of the multimedia content and/or the target image display position of the multimedia content.

The target display mode may include: a target display ratio, or a target display region, or a target display ratio and a target display region.

Based on the above example, when the target display mode is the second display ratio, the multimedia content can be displayed on the display apparatus in a full-screen state corresponding to the display region 2. When the target display mode is the third display ratio, the multimedia content is displayed on the display apparatus in a full-screen state corresponding to display region 3.

When the target display mode is the first display position, the multimedia content is displayed on the display region 4 of the display apparatus, and the image display size of the multimedia content is identical to the image size of the display region 4. When the target display mode is the second display position, the multimedia content is displayed on the display region 5 of the display apparatus. The image display size of the multimedia content is identical to the image size of the display region 5. When the target display mode is the third display position, the multimedia content is displayed on the display region 6 of the display apparatus. The image display size of the multimedia content is identical to the image size of the display region 6.

Based on the description of the above embodiments, in the present disclosure, the positional relationship between the image region corresponding to the human face and the surrounding image may include: an angle between the image region corresponding to the human face and the center point of the surrounding image in the vertical direction, where the vertical direction may be the direction of a vertical side corresponding to a horizontal direction of the ground where the user is standing.

Figure 23A:
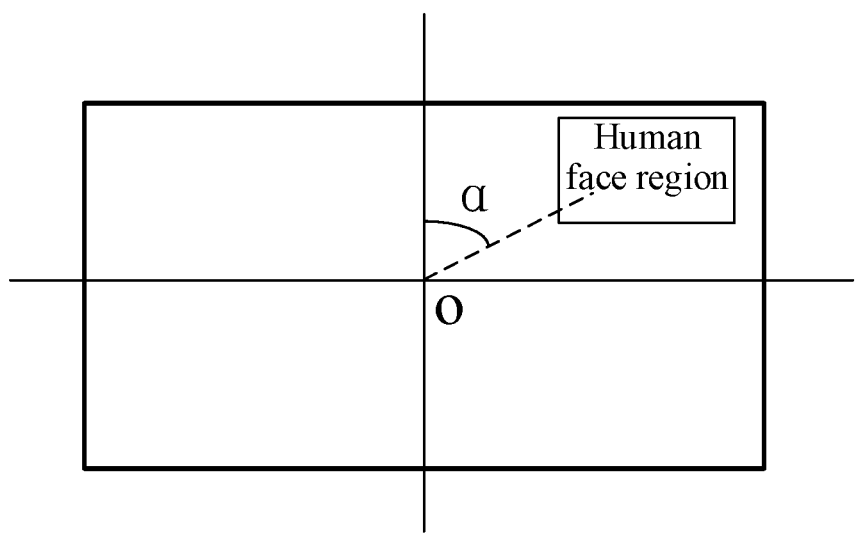
FIG. 23A is a schematic diagram of an angle between a human face region and a center point of a surrounding image according to some embodiments.

As shown in FIG. 23A, the surrounding image can be divided into four display regions by horizontal direction lines (horizontal lines) and vertical direction lines (vertical lines), which can include: upper left region, lower left region, upper right region and lower right region. In FIG. 23A, the image region corresponding to the human face is the human face region, the center point of the surrounding image is the point O, and the angle between the human face region and point O in the vertical direction is a.

In some embodiments, when determining the target display mode of the multimedia content based on the initial display mode of the multimedia content and the positional relationship between the image region corresponding to the human face and the surrounding image, the target image display ratio of the multimedia content can be effectively determined through determining the initial image display ratio included in the initial display mode in combination with the angle between the image region corresponding to the human face and the center point of the surrounding image in the vertical direction.

Here, a preset image display ratio can be used to determine the initial image display ratio included in the initial display mode, and then a change of the angle between the image region corresponding to the human face and the center point of the surrounding image in the vertical direction can be detected, so as to effectively determine the target image display ratio of the multimedia content.

Here, a preset image display ratio can be used for describing the current screen display state of the display apparatus. For example, the image display ratio can be preset to 16:9, indicating that the current screen display state of the display apparatus is full-screen display, which is used as a precondition for determining a change of the angle information included in the positional relationship.

It should be noted that when detecting changes of the angle between the image region corresponding to the human face and the center point of the surrounding image in the vertical direction, multiple angle ranges can be set in advance. When the angle between the image region corresponding to the human face and the center point of the surrounding image in the vertical direction changes to another angle range, it is determined that the angle between the image region corresponding to the human face and the center point of the surrounding image in the vertical direction changes.

For example, three angle ranges can be preset to reflect the angle between the image region corresponding to the user's face and the center point of the surrounding image. For example, the three angle ranges are: a first angle range, a second angle range and a third angle range, where the first angle range is [0, 30°], the second angle range is (30°, 45°], the third angle range is (45°, 60°]. Assuming that the initial angle between the image region corresponding to the human face and the center point of the surrounding image in the vertical direction is 25°, and the initial angle between the image region corresponding to the human face and the center point of the surrounding image in the vertical direction changes to 50°, it is determined that the angle between the image region corresponding to the human face and the center point of the surrounding image changes.

Here, when determining the target image display ratio of the multimedia content based on the angle information included in the positional relationship, the angle between the image region corresponding to the human face and the center point of the surrounding image can be compared with a preset angle range, thereby effectively determining a target image display ratio of the multimedia content adaptive to the user's face.

Here, when setting the angle range, the specific range of the angle between the image region corresponding to the human face and the center point of the surrounding image can be set based on the relationship between the viewing angle of the human face and sharpness.

Figure 23B:
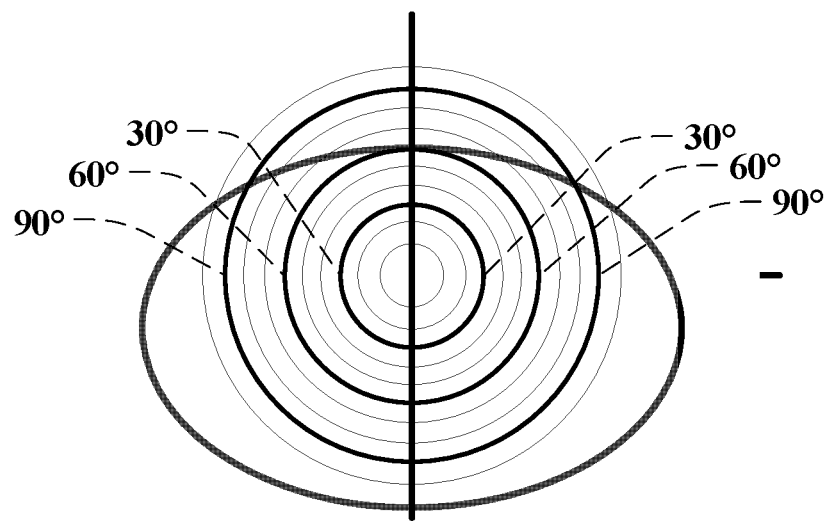
FIG. 23B is a diagram of a relationship between a human eye viewing angle and sharpness according to some embodiments.

As shown in FIG. 23B, when the viewing angle of the human face is in an angle range corresponding to a first region (α≤30°), the sharpness is better. When the viewing angle of the human face is in an angle range corresponding to a second region (30°<α≤45°), it means the sharpness is average. When the viewing angle of the human face is in an angle range corresponding to a third region (45°<α≤60°), it means the sharpness is not good.

Figure 23C:
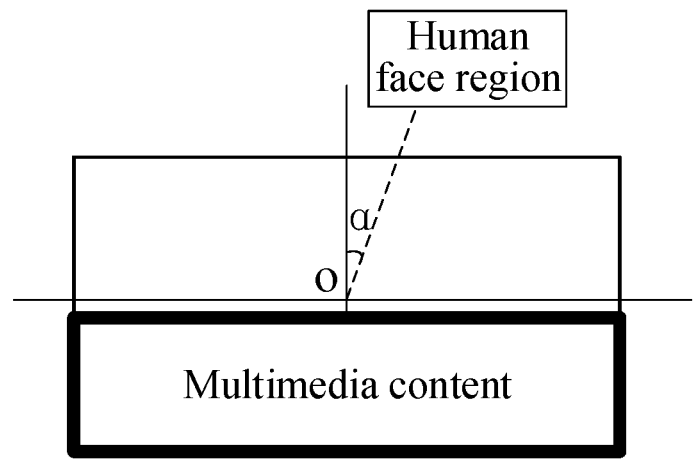
FIG. 23C is a schematic diagram of a first image display ratio of a multimedia content according to some embodiments.

For example, when it is detected that the angle between the image region corresponding to the human face and the center point of the surrounding image is within the first range, a first target image display ratio of the multimedia content adaptive to the user's face can be determined. As shown in FIG. 23C, combined with FIG. 23A, when it is detected that the angle α between the face and the center point O is less than or equal to 30°, it can be determined that the target image display ratio of the multimedia content adaptive to the user's face is 32:9.

Figure 23D:
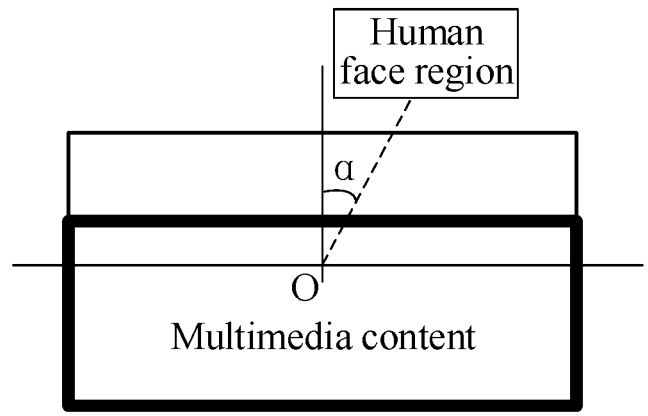
FIG. 23D is a schematic diagram of a second image display ratio of a multimedia content according to some embodiments.

When it is detected that the angle between the image region corresponding to the human face and the center point of the surrounding image is within the second angle range, a second target image display ratio of the multimedia content adaptive to the user's face can be determined. As shown in FIG. 23D, combined with FIG. 23A, when it is detected that the angle α between the face and the center point O is greater than 30° or less than or equal to 45°, it can be determined that the target image display ratio of multimedia content adaptive to the user's face is 21:9.

Figure 23E:
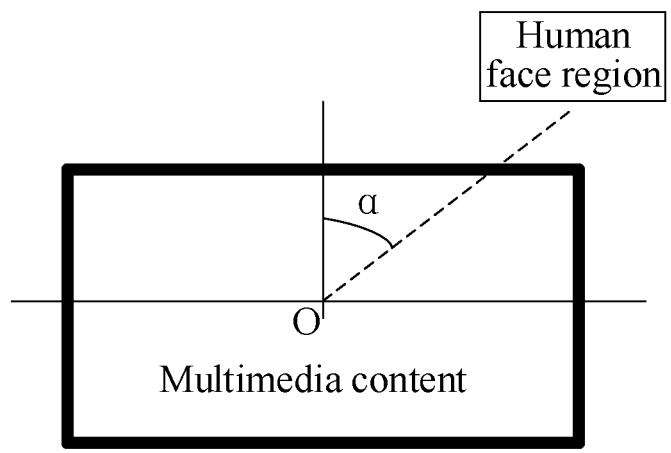
FIG. 23E is a schematic diagram of a third image display ratio of a multimedia content according to some embodiments.

When it is detected that the angle between the image region corresponding to the human face and the center point of the surrounding image is within the third angle range, a third target image display ratio of the multimedia content adaptive to the user's face can be determined. As shown in FIG. 23E, combined with FIG. 23A, when it is detected that the angle α between the image region corresponding to the face and the center point of the surrounding image is greater than 45° or less than or equal to 60°, it can be determined that the target image display ratio of the multimedia content adaptive to the user's face is 16:9.

Therefore, the user can obtain a more satisfactory viewing experience when watching TV from different viewing angles.

In addition, after adjusting the target image display ratio of the multimedia content based on the user's viewing angle, it is also necessary to perform a check on the target image display ratio based on the preset image display ratio to effectively ensure that the user's viewing position is consistent with the vertical position of the TV image display.

The preset image display ratio may be a display ratio for full-screen display in the display apparatus, such as 16:9.

Here, when performing a check on the target image display ratio based on the preset image display ratio, if the adjusted target image display ratio of the multimedia content is 16:9, it is determined that the vertical position of the user's viewing and the vertical position of the TV image display are maintained consistently; if the adjusted target image display ratio of the multimedia content is not 16:9, the vertical display position of the TV image needs to be adjusted again. The adjustment method of the image display position has been explained above and will not be repeated here.

Based on the description of the above embodiments, in the present disclosure, the positional relationship between the image region corresponding to the human face and the surrounding image may also include: a relative vertical distance between the human face and the surrounding image (such as one of the uppermost position, the lowermost position) in the horizontal direction, or a proportion of an area of the human face region (the image region corresponding to the human face) in multiple regions of the surrounding image. It should be noted that the relative vertical distance between the human face and the surrounding image in the horizontal direction can effectively represent the proportion of the area of the human face region in multiple regions of the surrounding image.

Figure 24A:
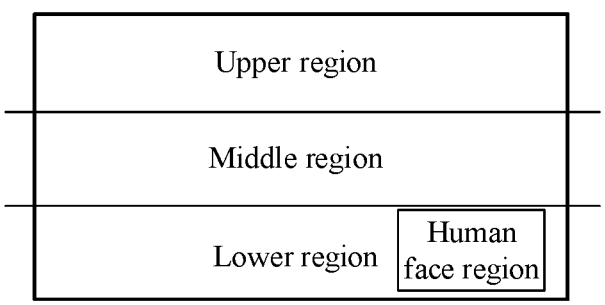
FIG. 24A is a schematic diagram of displaying a multimedia content according to some embodiments.

As shown in FIG. 24A, the surrounding image can be divided into three display regions, namely: an upper region, a middle region and a lower region. In FIG. 24A, the human face region is in the lower region.

In some embodiments, when determining the target display mode of the multimedia content based on the initial display mode of the multimedia content and the positional relationship between the image region corresponding to the human face and the surrounding image, the initial image display ratio can also be determined. Therefore, the target image display position of the multimedia content is determined based on the initial image display ratio and the proportion of the area of the human face region in the multiple regions in the surrounding image.

Here, a preset image display ratio can be used to determine the initial image display ratio included in the initial display mode, and then the change in the relative vertical distance between the human face and the display apparatus in the horizontal direction is detected, so as to effectively determine the target image display position of the multimedia content.

Here, a preset image display ratio can be used for describing the current screen display status of the display apparatus. For example, the image display ratio can be preset to 16:9, indicating that the current screen display state of the display apparatus is full-screen display, which can be used as a precondition for determining a change of the distance included in the positional relationship.

It should be noted that when detecting the change in the relative vertical distance between the face and the surrounding image in the horizontal direction, a proportion region of the face region in the surrounding image can be determined first through the distance, and when the proportion region changes, it can be determined that the relative vertical distance between the face and the display apparatus in the horizontal direction changes.

Figure 24B:
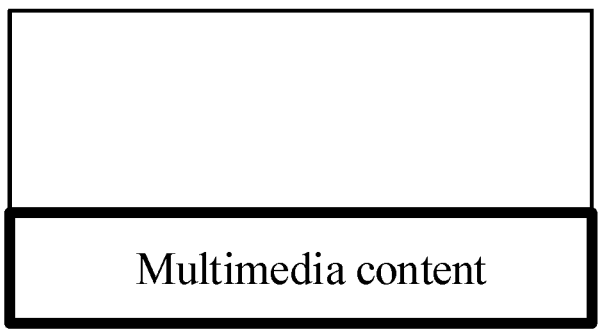
FIG. 24B is a schematic diagram of an interface with a first image display position of a multimedia content according to some embodiments.

For example, when it is detected that the distance is within a first preset distance range, the largest proportion region of the face region in the surrounding image can be determined so as to determine the target image display position of the multimedia content. As shown in FIG. 24B, when it is detected that the distance between the face region and the bottom of the surrounding image is less than 1 cm, it can be determined that the largest proportion region of the face region in the surrounding image is the lower region, and then the target image display position of the multimedia content is determined to be the display region 6 of the display apparatus.

Figure 24C:
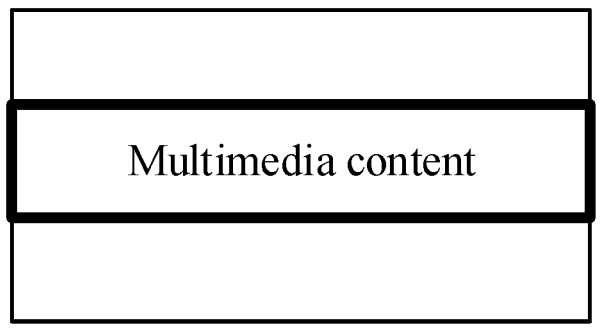
FIG. 24C is a schematic diagram of an interface with a second image display position of a multimedia content according to some embodiments.

When it is detected that the distance is within a second preset distance range, another region with the largest proportion of the face region in the surrounding image can be determined so as to determine the target image display position of the multimedia content. As shown in FIG. 24C, when it is detected that the distance between the face region and the bottom of the surrounding image is 20-25 cm, it can be determined that the largest proportion region of the face region in the surrounding image is the middle region, and then the target image display position of the multimedia content is determined to be the display region 5 of the display apparatus.

Figure 24D:
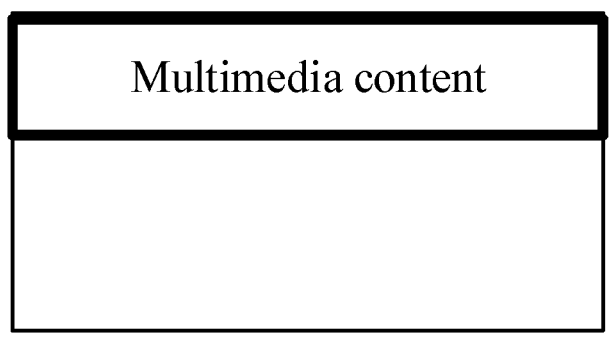
FIG. 24D is a schematic diagram of an interface with a third image display position of a multimedia content according to some embodiments.

When it is detected that the distance is within a third preset distance range, another region with the largest proportion of the face region in the surrounding image can be determined so as to determine the target image display position of the multimedia content. As shown in FIG. 24D, when it is detected that the distance between the face region and the bottom of the surrounding image is 35-40 cm, it can be determined that the largest proportion region of the face region in the surrounding image is the upper region, and then the target image display position of the multimedia content is determined to be the display region 4 of the display apparatus.

To sum up, the present disclosure implements the above display method on a display apparatus to collect a surrounding image corresponding to the display apparatus, determine an image region corresponding to a human face included in the surrounding image, and determine a target display mode of a multimedia content based on an initial display mode of the multimedia content and a positional relationship between the image region corresponding to the human face and the surrounding image, where the target display mode is used for describing a target image display ratio of the multimedia content and/or a target image display position of the multimedia content, thereby displaying the multimedia content based on the target display mode. Through the above method, when the user watches the multimedia content, the adaptive display mode of the multimedia content can be determined based on the user's different postures, the best match between the display image of the multimedia content and the viewing angle of the user's eyes is always maintained, and the user's viewing satisfaction and viewing angle effect are improved.

It can be seen from the above embodiments that since the processor(s) in the display apparatus of embodiments of the present disclosure can determine the target display mode of the multimedia content to be displayed based on the user's control, the target display mode can be used for describing the target image display ratio of the multimedia content and/or the target image display position of the multimedia content, and control the display apparatus to display the multimedia content based on the target display mode. Based on this, the purpose of displaying the multimedia content quickly and accurately can be achieved.

For convenience of explanation, the above description has been made in conjunction with specific embodiments. However, the above discussion of some embodiments is not intended to be exhaustive or to limit embodiments to the precise forms disclosed. Various modifications and variations are possible in light of the above teachings. The above embodiments are selected and described to better explain principles and practical applications, thereby enabling those skilled in the art to better use embodiments and various modified embodiments suitable for specific use considerations.

What is claimed is:

1. A display apparatus, comprising:
a display, configured to display an image and/or a user interface;
an external device interface, configured to connect an external device;
at least one processor, configured to execute instructions to cause the display apparatus to:
obtain a first command input from a user for switching a viewing angle ratio;
obtain audio and video meta information of the external device, and parse a flag field in the audio and video meta information;
send declaration information to the external device according to the first command in response to the flag field being identical to a determination field, wherein the determination field is an identification value set by a graphic processor of the external device at a fixed position in a frame of the audio and video meta information, the declaration information comprises identification data that conforms to a protocol version of the external device interface and a switched viewing angle ratio;
receive video data returned from the external device for the declaration information, wherein an image ratio of the video data is equivalent with the switched viewing angle ratio; and
control the display to display the video data.

2. The display apparatus according to claim 1, wherein the at least one processor is further configured to execute instructions to cause the display apparatus to:
mark the external device as a first-type device in response to the flag field being identical to the determination field, wherein the first-type device refers to a device that can return video data that conforms to a corresponding viewing angle ratio to the display apparatus;
mark the external device as a second-type device in response to the flag field being different from the determination field, wherein the second-type device refers to a device that cannot return video data that conforms to a corresponding viewing angle ratio to the display apparatus.

3. The display apparatus according to claim 1, wherein the declaration information is Extended Display Identification Data, EDID, information; the identification data is standard timing data in the EDID information; the at least one processor is further configured to execute instructions to cause the display apparatus to:
extract the switched viewing angle ratio from the first command during sending the declaration information to the external device;
detect a protocol version of the external device interface;
query the standard timing data in a preset comparison table using the switched viewing angle ratio and the protocol version; wherein the preset comparison table comprises a plurality of protocol versions and standard timing data determined according to a maximum transmission rate supported by each protocol version;
add the standard timing data to the EDID information to generate the declaration information.

4. The display apparatus according to claim 1, wherein the at least one processor is further configured to execute instructions to cause the display apparatus to:
obtain a second command input from the user for switching the protocol version of the external device interface;
query identification data according to a switched protocol version of the external device interface in response to the second command;
use the identification data to update the declaration information;
send the updated declaration information to the external device.

5. The display apparatus according to claim 1, wherein the at least one processor is further configured to execute instructions to cause the display apparatus to:

control to lower a hotplug voltage to notify the external device to read the declaration information during receiving the video data returned from the external device for the declaration information;

control to lower the hotplug voltage again after a preset delay time, to notify the external device to switch the viewing angle ratio and return the video data according to the switched viewing angle ratio.

6. The display apparatus according to claim 1, wherein the at least one processor is further configured to execute instructions to cause the display apparatus to:

extract an identification frame image from the video data during controlling the display to display the video data;

detect a resolution of the identification frame image;

display the video data according to the switched viewing angle ratio in response to the resolution of the identification frame image being equal to a resolution of the switched viewing angle ratio;

modify the identification data in the declaration information to identification data before the viewing angle ratio is switched, to display the video data according to the viewing angle ratio before being switched, in response to the resolution of the identification frame image being not equal to the resolution of the switched viewing angle ratio.

7. The display apparatus according to claim 1, wherein the at least one processor is further configured to execute instructions to cause the display apparatus to:

detect a screen width and a screen height of the display during controlling the display to display the video data;

obtain an image width and an image height of the video data;

construct a virtual screen, wherein an aspect ratio of the virtual screen is equal to the target image display ratio of the video data; a width of the virtual screen is equal to the screen width of the display, a height of the virtual screen is equal to a multiple of a scaling ratio of the screen height, and the scaling ratio is equal to a ratio of the image height to the screen height;

display the video data according to the virtual screen.

8. The display apparatus according to claim 1, wherein the at least one processor is further configured to execute instructions to cause the display apparatus to:

control the display to display a setting interface in response to the user's interactive action, wherein the setting interface comprises a plurality of image movement options and a plurality of viewing angle ratio switching options;

monitor a selection action performed by the user based on the setting interface;

adjust a display position of the video data on the display according to an image movement option in response to the user performing the selection action on the image movement option;

generate a command for switching the viewing angle ratio according to a viewing angle ratio switching option selected by the selection action in response to the user performing the selection action on the viewing angle ratio switching option.

9. The display apparatus according to claim 2, wherein the at least one processor is further configured to execute instructions to cause the display apparatus to:

determine the declaration information according to an original viewing angle ratio of the external device in response to the external device being the second-type device.

10. The display apparatus according to claim 3, wherein the standard timing data comprises a maximum resolution and a maximum frame rate.

11. A display method for a display apparatus, the method comprising:

obtaining a first command input from a user for switching a viewing angle ratio;

obtaining audio and video meta information of an external device, and parsing a flag field in the audio and video meta information;

sending declaration information to the external device according to the first command in response to the flag field being identical to a determination field, wherein the determination field is an identification value set by a graphic processor of the external device at a fixed position in a frame of the audio and video meta information, the declaration information comprises identification data that conforms to a protocol version of an external device interface of the display apparatus and a switched viewing angle ratio;

receiving video data returned from the external device for the declaration information, wherein an image ratio of the video data is equivalent with the switched viewing angle ratio; and controlling a display of the display apparatus to display the video data.

12. The method according to claim 11, wherein the method further comprises:

marking the external device as a first-type device in response to the flag field being identical to the determination field, wherein the first-type device refers to a device that can return video data that conforms to a corresponding viewing angle ratio to the display apparatus;

marking the external device as a second-type device in response to the flag field being different from the determination field, wherein the second-type device refers to a device that cannot return video data that conforms to a corresponding viewing angle ratio to the display apparatus.

13. The method according to claim 11, wherein the declaration information is Extended Display Identification Data, EDID, information; the identification data is standard timing data in the EDID information; the method further comprises:

extracting the switched viewing angle ratio from the first command during sending the declaration information to the external device;

detecting a protocol version of the external device interface;

querying the standard timing data in a preset comparison table using the switched viewing angle ratio and the protocol version; wherein the preset comparison table comprises a plurality of protocol versions and standard timing data determined according to a maximum transmission rate supported by each protocol version;

adding the standard timing data to the EDID information to generate the declaration information.

14. The method according to claim 11, wherein the method further comprises:

obtaining a second command input from the user for switching the protocol version of the external device interface;

querying identification data according to a switched protocol version of the external device interface in response to the second command;

using the identification data to update the declaration information;

sending the updated declaration information to the external device.

15. The method according to claim 11, wherein the method further comprises:

controlling to lower a hotplug voltage to notify the external device to read the declaration information during receiving the video data returned from the external device for the declaration information;

controlling to lower the hotplug voltage again after a preset delay time, to notify the external device to switch the viewing angle ratio and return the video data according to the switched viewing angle ratio.

16. The method according to claim 11, wherein the method further comprises:

extracting an identification frame image from the video data during controlling the display to display the video data;

detecting a resolution of the identification frame image;

displaying the video data according to the switched viewing angle ratio in response to the resolution of the identification frame image being equal to a resolution of the switched viewing angle ratio;

modifying the identification data in the declaration information to identification data before the viewing angle ratio is switched, to display the video data according to the viewing angle ratio before being switched, in response to the resolution of the identification frame image being not equal to the resolution of the switched viewing angle ratio.

17. The method according to claim 11, wherein the method further comprises:

detecting a screen width and a screen height of the display during controlling the display to display the video data;

obtaining an image width and an image height of the video data;

constructing a virtual screen, wherein an aspect ratio of the virtual screen is equal to the target image display ratio of the video data; a width of the virtual screen is equal to the screen width of the display, a height of the virtual screen is equal to a multiple of a scaling ratio of the screen height, and the scaling ratio is equal to a ratio of the image height to the screen height;

displaying the video data according to the virtual screen.

18. The method according to claim 11, wherein the method further comprises:

controlling the display to display a setting interface in response to the user's interactive action, wherein the setting interface comprises a plurality of image movement options and a plurality of viewing angle ratio switching options;

monitoring a selection action performed by the user based on the setting interface;

adjusting a display position of the video data on the display according to an image movement option in response to the user performing the selection action on the image movement option;

generating a command for switching the viewing angle ratio according to a viewing angle ratio switching option selected by the selection action in response to the user performing the selection action on the viewing angle ratio switching option.

19. The method according to claim 12, wherein the method further comprises:

determine the declaration information according to an original viewing angle ratio of the external device in response to the external device being the second-type device.

20. The method according to claim 13, wherein the standard timing data comprises a maximum resolution and a maximum frame rate.

* * * * *